United States Patent
Shannon et al.

(10) Patent No.: US 11,330,006 B2
(45) Date of Patent: May 10, 2022

(54) DETECTING AND IDENTIFYING DEVICES AT ENTERPRISE LOCATIONS TO PROTECT ENTERPRISE-MANAGED INFORMATION AND RESOURCES

(71) Applicant: Bank of America Corporation, Charlotte, NC (US)

(72) Inventors: Stephen T. Shannon, Charlotte, NC (US); James Alexander, Dripping Springs, TX (US); Brian J. Smith, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 423 days.

(21) Appl. No.: 16/554,871

(22) Filed: Aug. 29, 2019

(65) Prior Publication Data

US 2021/0067530 A1 Mar. 4, 2021

(51) Int. Cl.
| | | |
|---|---|---|
| *H04W 8/00* | (2009.01) | |
| *H04W 12/122* | (2021.01) | |
| *H04L 29/06* | (2006.01) | |
| *G06T 19/00* | (2011.01) | |

(52) U.S. Cl.
CPC ........ *H04L 63/1425* (2013.01); *G06T 19/006* (2013.01); *H04L 63/105* (2013.01); *H04L 63/107* (2013.01); *H04L 63/1416* (2013.01); *H04W 8/005* (2013.01); *H04W 12/122* (2021.01)

(58) Field of Classification Search
CPC . H04L 63/1425; H04L 63/105; H04L 63/107; H04L 63/1416; H04W 12/122; H04W 8/005; G06T 19/006
See application file for complete search history.

(56) References Cited

U.S. PATENT DOCUMENTS

| | | |
|---|---|---|
| 8,131,846 B1 | 3/2012 | Hernacki et al. |
| 9,749,342 B1 | 8/2017 | Krage et al. |
| 9,767,663 B2 | 9/2017 | Reske |
| 9,788,211 B2 | 10/2017 | Zhang |
| 9,961,624 B1 | 5/2018 | Zait |
| 10,104,118 B2 | 10/2018 | Wang et al. |

(Continued)

OTHER PUBLICATIONS

Jan. 25, 2022—U.S. Non-Final Office Action—U.S. Appl. No. 16/554,845.

*Primary Examiner* — Hosuk Song
(74) *Attorney, Agent, or Firm* — Banner & Witcoff, Ltd.

(57) ABSTRACT

Aspects of the disclosure relate to detecting and identifying devices at enterprise locations to protect enterprise-managed information and resources. In some embodiments, a computing platform may capture information identifying devices present at a first enterprise location during a malicious event. Then, the computing platform may generate alerts when one of the devices present at the first enterprise location during the malicious event is detected at a second enterprise location. In other embodiments, when such a device is detected at the second enterprise location, an enterprise center monitoring system may generate commands that cause an augmented reality device at the second enterprise location to present one or more augmented-reality user interfaces that include one or more augmented-reality elements identifying a user in possession of the detected device.

20 Claims, 13 Drawing Sheets

(56) References Cited

U.S. PATENT DOCUMENTS

| | | | |
|---|---|---|---|
| 10,109,166 B1 | 10/2018 | Selinger et al. | |
| 10,243,786 B2 * | 3/2019 | Rjeili | G06Q 10/10 |
| 10,257,668 B2 | 4/2019 | Shaw et al. | |
| 10,496,061 B2 * | 12/2019 | Strohmenger | G05B 17/02 |
| 10,594,717 B2 * | 3/2020 | Watkiss | H04L 63/1416 |
| 10,686,655 B2 * | 6/2020 | Rjeili | H04W 4/025 |
| 10,728,269 B2 * | 7/2020 | Watkiss | H04L 63/1416 |
| 10,878,110 B2 * | 12/2020 | Kraft | H04L 63/1433 |
| 10,951,642 B2 * | 3/2021 | Watkiss | G06N 5/025 |
| 10,986,109 B2 * | 4/2021 | Howard | H04L 63/1458 |
| 10,986,122 B2 * | 4/2021 | Bloxham | H04W 12/128 |
| 2005/0050336 A1 | 3/2005 | Liang et al. | |
| 2012/0151588 A1 | 6/2012 | Wang et al. | |
| 2013/0097660 A1 | 4/2013 | Das et al. | |
| 2014/0164282 A1 | 6/2014 | Asbury | |
| 2016/0232353 A1 | 8/2016 | Gupta et al. | |
| 2017/0214702 A1 | 7/2017 | Moscovici et al. | |
| 2019/0236278 A1 | 8/2019 | Martinez et al. | |
| 2019/0236594 A1 | 8/2019 | Ehrlich-Quinn | |
| 2019/0238561 A1 | 8/2019 | McGloin et al. | |
| 2019/0238570 A1 | 8/2019 | Mehner | |
| 2019/0238574 A1 | 8/2019 | Iliofotou et al. | |
| 2019/0238588 A1 | 8/2019 | Sites | |
| 2019/0238592 A1 | 8/2019 | Qureshi et al. | |
| 2019/0242718 A1 | 8/2019 | Siskind et al. | |
| 2019/0243971 A1 | 8/2019 | Call et al. | |
| 2019/0244147 A1 | 8/2019 | Singh et al. | |
| 2019/0244248 A1 | 8/2019 | Purves et al. | |
| 2019/0245681 A1 | 8/2019 | Alwen | |
| 2019/0245682 A1 | 8/2019 | Alwen | |
| 2019/0245845 A1 | 8/2019 | Marinho et al. | |
| 2019/0245852 A1 | 8/2019 | Irwan et al. | |
| 2019/0245856 A1 | 8/2019 | Irwan et al. | |
| 2019/0245876 A1 | 8/2019 | Faigon et al. | |
| 2019/0245883 A1 | 8/2019 | Gorodissky et al. | |
| 2019/0245888 A1 | 8/2019 | Martinez et al. | |
| 2019/0245894 A1 | 8/2019 | Epple et al. | |
| 2019/0250937 A1 | 8/2019 | Thomas et al. | |
| 2019/0251258 A1 | 8/2019 | Walters et al. | |
| 2019/0251260 A1 | 8/2019 | Stockdale et al. | |
| 2019/0253399 A1 | 8/2019 | Humphries et al. | |
| 2019/0253404 A1 | 8/2019 | Briceno et al. | |
| 2019/0253437 A1 | 8/2019 | Barak et al. | |
| 2019/0253453 A1 | 8/2019 | Vissamsetty et al. | |
| 2019/0258781 A1 | 8/2019 | Qureshi et al. | |
| 2019/0258800 A1 | 8/2019 | Ladnai et al. | |
| 2019/0260713 A1 | 8/2019 | Jakobsson et al. | |
| 2019/0260764 A1 | 8/2019 | Humphrey et al. | |
| 2019/0260767 A1 | 8/2019 | Oz et al. | |
| 2019/0260768 A1 | 8/2019 | Mestha et al. | |
| 2019/0260770 A1 | 8/2019 | Sansom et al. | |
| 2019/0260775 A1 | 8/2019 | Bartos et al. | |
| 2019/0260779 A1 | 8/2019 | Bazalgette et al. | |
| 2019/0260780 A1 | 8/2019 | Dunn et al. | |
| 2019/0260781 A1 | 8/2019 | Fellows et al. | |
| 2019/0260782 A1 | 8/2019 | Humphrey et al. | |
| 2019/0260783 A1 | 8/2019 | Humphrey et al. | |
| 2019/0260784 A1 | 8/2019 | Stockdale et al. | |
| 2019/0260785 A1 | 8/2019 | Jenkinson et al. | |
| 2019/0260786 A1 | 8/2019 | Dunn | |
| 2019/0260793 A1 | 8/2019 | Stockdale et al. | |
| 2019/0260794 A1 | 8/2019 | Woodford et al. | |
| 2019/0260795 A1 | 8/2019 | Araiza et al. | |
| 2019/0260796 A1 | 8/2019 | Hamdi | |
| 2019/0260804 A1 | 8/2019 | Beck et al. | |
| 2019/0261171 A1 | 8/2019 | Cozzetti | |
| 2019/0261203 A1 | 8/2019 | Raleigh | |
| 2020/0236120 A1 | 7/2020 | Monteil et al. | |

* cited by examiner

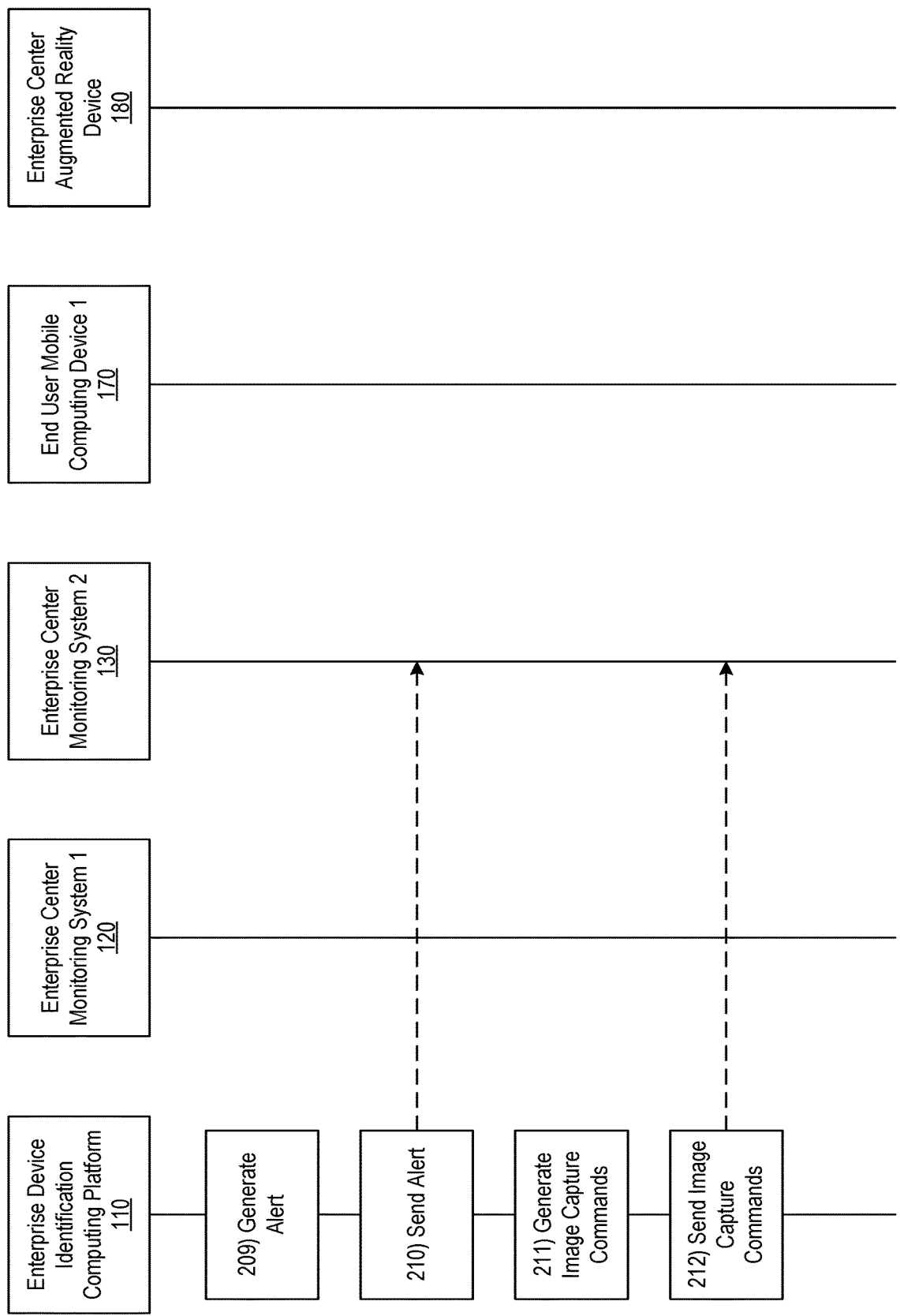

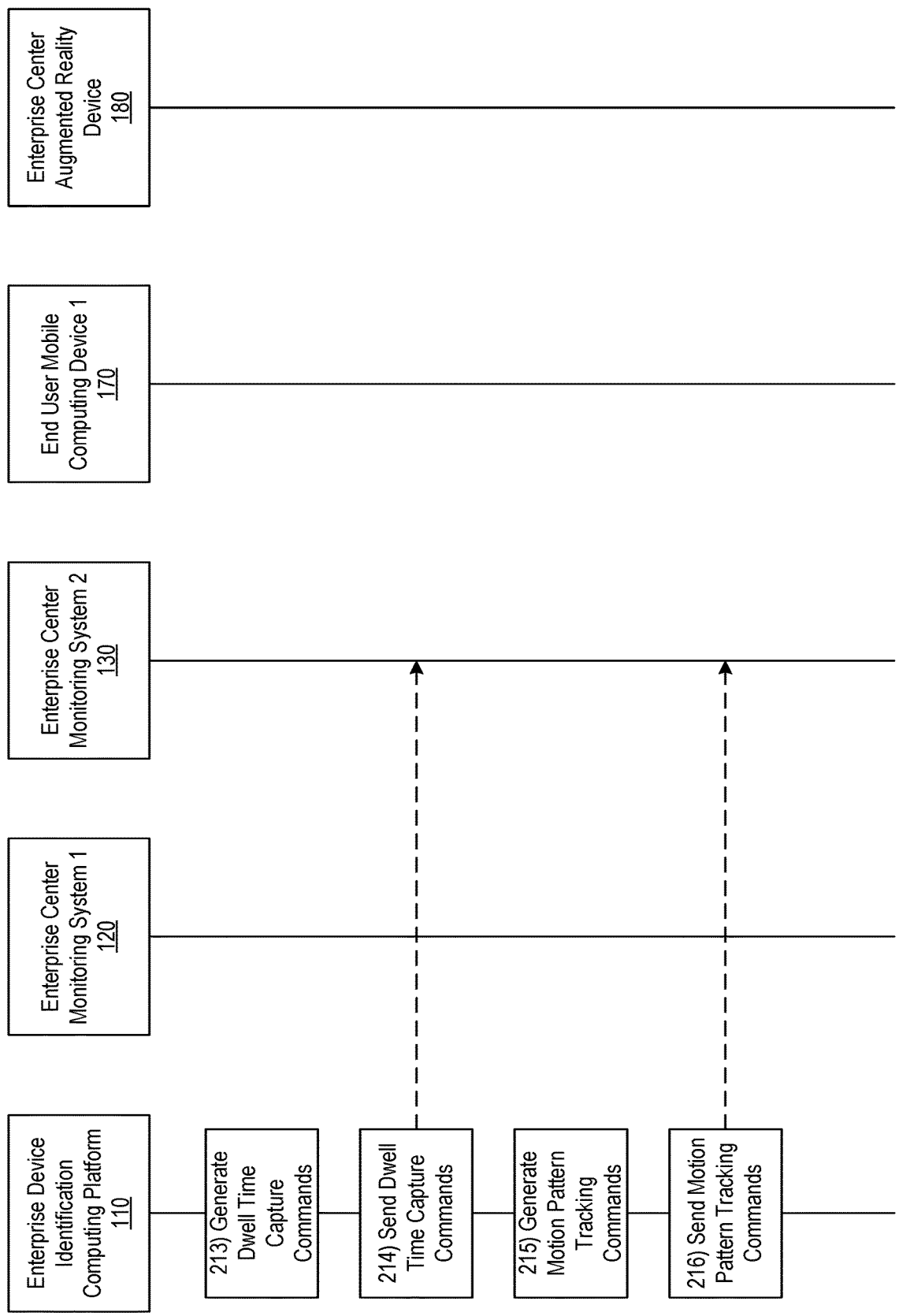

DETECTING AND IDENTIFYING DEVICES AT ENTERPRISE LOCATIONS TO PROTECT ENTERPRISE-MANAGED INFORMATION AND RESOURCES

BACKGROUND

Aspects of the disclosure relate to deploying digital data processing systems, ensuring information security, and preventing unauthorized access to resources at enterprise locations. In particular, one or more aspects of the disclosure relate to detecting and identifying devices at enterprise locations to protect enterprise-managed information and resources.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. In many instances, it may be difficult to ensure the security and integrity of enterprise-managed information and resources, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with ensuring information security and preventing unauthorized access by detecting and identifying devices at enterprise locations to protect enterprise-managed information and resources.

In accordance with one or more embodiments, a computing platform having at least one processor, a communication interface, and memory may receive, via the communication interface, from a first enterprise center monitoring system associated with a first enterprise location, information indicating that a first malicious event has been detected at the first enterprise location. In response to receiving the information indicating that the first malicious event has been detected at the first enterprise location, the computing platform may capture first device information identifying a first plurality of devices present at the first enterprise location during a time period corresponding to the first malicious event. Subsequently, the computing platform may store the first device information identifying the first plurality of devices present at the first enterprise location during the time period corresponding to the first malicious event.

After storing the first device information identifying the first plurality of devices present at the first enterprise location during the time period corresponding to the first malicious event, the computing platform may receive, via the communication interface, from a second enterprise center monitoring system associated with a second enterprise location, second device information identifying a second plurality of devices present at the second enterprise location. Then, the computing platform may identify that a first device of the first plurality of devices present at the first enterprise location during the time period corresponding to the first malicious event is present at the second enterprise location based on the second device information received from the second enterprise center monitoring system associated with the second enterprise location. In response to identifying that the first device of the first plurality of devices present at the first enterprise location during the time period corresponding to the first malicious event is present at the second enterprise location, the computing platform may generate an alert indicating that the first device of the first plurality of devices is present at the second enterprise location and was present at the first enterprise location during the time period corresponding to the first malicious event. Thereafter, the computing platform may send, via the communication interface, to the second enterprise center monitoring system associated with the second enterprise location, the alert indicating that the first device of the first plurality of devices is present at the second enterprise location and was present at the first enterprise location during the time period corresponding to the first malicious event.

In some embodiments, receiving the information indicating that the first malicious event has been detected at the first enterprise location may include receiving information indicating that the first malicious event has been detected at a staffed enterprise service center. In some embodiments, receiving the information indicating that the first malicious event has been detected at the first enterprise location may include receiving information indicating that the first malicious event has been detected at an automated enterprise service center.

In some embodiments, capturing the first device information identifying the first plurality of devices present at the first enterprise location during the time period corresponding to the first malicious event may include: generating one or more commands directing the first enterprise center monitoring system to scan for devices present at the first enterprise location; and sending, to the first enterprise center monitoring system, the one or more commands directing the first enterprise center monitoring system to scan for devices present at the first enterprise location.

In some embodiments, capturing the first device information identifying the first plurality of devices present at the first enterprise location during the time period corresponding to the first malicious event may include: receiving, from the first enterprise center monitoring system, forensic data associated with one or more devices that have scanned for available wireless connections at the first enterprise location.

In some embodiments, capturing the first device information identifying the first plurality of devices present at the first enterprise location during the time period corresponding to the first malicious event may include: capturing information identifying at least one device present at the first enterprise location before the time period corresponding to the first malicious event; and capturing information identifying at least one device present at the first enterprise location after the time period corresponding to the first malicious event.

In some embodiments, storing the first device information identifying the first plurality of devices present at the first enterprise location during the time period corresponding to the first malicious event may include: generating a unique device signature for each device of the first plurality of devices present at the first enterprise location during the time period corresponding to the first malicious event; and storing the unique device signature generated for each device of the first plurality of devices present at the first enterprise location during the time period corresponding to the first malicious event.

In some embodiments, storing the first device information identifying the first plurality of devices present at the first enterprise location during the time period corresponding to the first malicious event may include: storing a timestamp, location identifier, and event-type identifier for each device of the first plurality of devices present at the first enterprise location during the time period corresponding to the first malicious event.

In some embodiments, storing the first device information identifying the first plurality of devices present at the first enterprise location during the time period corresponding to the first malicious event may include: filtering out at least one enterprise-affiliated device from the first plurality of devices present at the first enterprise location during the time period corresponding to the first malicious event.

In some embodiments, receiving the second device information identifying the second plurality of devices present at the second enterprise location may include receiving, from the second enterprise center monitoring system, forensic data associated with one or more devices that have scanned for available wireless connections at the second enterprise location.

In some embodiments, identifying that the first device of the first plurality of devices present at the first enterprise location during the time period corresponding to the first malicious event is present at the second enterprise location may include: identifying that the first device of the first plurality of devices present at the first enterprise location during the time period corresponding to the first malicious event is present at the second enterprise location based on a unique device signature generated for the first device of the first plurality of devices present at the first enterprise location during the time period corresponding to the first malicious event.

In some embodiments, generating the alert indicating that the first device of the first plurality of devices is present at the second enterprise location and was present at the first enterprise location during the time period corresponding to the first malicious event may include: inserting a timestamp, location identifier, and event-type identifier obtained from the first device information into the alert indicating that the first device of the first plurality of devices is present at the second enterprise location and was present at the first enterprise location during the time period corresponding to the first malicious event.

In some embodiments, in response to identifying that the first device of the first plurality of devices present at the first enterprise location during the time period corresponding to the first malicious event is present at the second enterprise location, the computing platform may generate one or more commands directing a video surveillance system at the second enterprise location to capture one or more images of a user in possession of the first device. Subsequently, the computing platform may send, via the communication interface, to the video surveillance system at the second enterprise location, the one or more commands directing the video surveillance system at the second enterprise location to capture the one or more images of the user in possession of the first device. In addition, sending the one or more commands directing the video surveillance system at the second enterprise location to capture the one or more images of the user in possession of the first device to the video surveillance system at the second enterprise location may cause the video surveillance system at the second enterprise location to take and store the one or more images of the user in possession of the first device.

In some embodiments, in response to identifying that the first device of the first plurality of devices present at the first enterprise location during the time period corresponding to the first malicious event is present at the second enterprise location, the computing platform may generate one or more commands directing the second enterprise center monitoring system associated with the second enterprise location to track dwell time statistics associated with a user in possession of the first device. Subsequently, the computing platform may send, via the communication interface, to the second enterprise center monitoring system associated with the second enterprise location, the one or more commands directing the second enterprise center monitoring system associated with the second enterprise location to track the dwell time statistics associated with the user in possession of the first device.

In some embodiments, in response to identifying that the first device of the first plurality of devices present at the first enterprise location during the time period corresponding to the first malicious event is present at the second enterprise location, the computing platform may generate one or more commands directing the second enterprise center monitoring system associated with the second enterprise location to track motion pattern data associated with a user in possession of the first device. Subsequently, the computing platform may send, via the communication interface, to the second enterprise center monitoring system associated with the second enterprise location, the one or more commands directing the second enterprise center monitoring system associated with the second enterprise location to track the motion pattern data associated with the user in possession of the first device.

In accordance with one or more additional embodiments, an enterprise center monitoring system having at least one processor, a communication interface, and memory may receive, via the communication interface, from an enterprise device identification computing platform, first device information identifying a first plurality of devices present at a first enterprise location during a time period corresponding to a first malicious event. Based on the first device information received from the enterprise device identification computing platform, the enterprise center monitoring system may detect that a first device of the first plurality of devices present at the first enterprise location during the time period corresponding to the first malicious event is present at a second enterprise location associated with the enterprise center monitoring system. In response to detecting that the first device of the first plurality of devices present at the first enterprise location during the time period corresponding to the first malicious event is present at the second enterprise location associated with the enterprise center monitoring system, the enterprise center monitoring system may generate one or more commands directing an augmented reality device at the second enterprise location to display an overlay highlighting a user in possession of the first device. Subsequently, the enterprise center monitoring system may send, via the communication interface, to the augmented reality device at the second enterprise location, the one or more commands directing the augmented reality device at the second enterprise location to display the overlay highlighting the user in possession of the first device. In addition, sending the one or more commands directing the augmented reality device at the second enterprise location to display the overlay highlighting the user in possession of the first device to the augmented reality device at the second enterprise location may cause the augmented reality device at the second enterprise location to present at least one augmented-reality user interface comprising at least one augmented-reality user interface element identifying the user in possession of the first device.

In some embodiments, receiving the first device information identifying the first plurality of devices present at the first enterprise location during the time period corresponding to the first malicious event may include receiving device data captured by the enterprise device identification computing platform from a monitoring system different from the enterprise center monitoring system.

In some embodiments, detecting that the first device of the first plurality of devices present at the first enterprise location during the time period corresponding to the first malicious event is present at the second enterprise location associated with the enterprise center monitoring system may include scanning for devices present at the second enterprise location.

In some embodiments, detecting that the first device of the first plurality of devices present at the first enterprise location during the time period corresponding to the first malicious event is present at the second enterprise location associated with the enterprise center monitoring system may include identifying that the first device is scanning for available wireless connections at the second enterprise location.

In some embodiments, generating the one or more commands directing the augmented reality device at the second enterprise location to display the overlay highlighting the user in possession of the first device may include inserting a unique device signature associated with the first device into the one or more commands directing the augmented reality device at the second enterprise location to display the overlay highlighting the user in possession of the first device.

In some embodiments, generating the one or more commands directing the augmented reality device at the second enterprise location to display the overlay highlighting the user in possession of the first device may include inserting a timestamp, location identifier, and event-type identifier associated with the first malicious event and the first device into the one or more commands directing the augmented reality device at the second enterprise location to display the overlay highlighting the user in possession of the first device.

In some embodiments, sending the one or more commands directing the augmented reality device at the second enterprise location to display the overlay highlighting the user in possession of the first device to the augmented reality device at the second enterprise location may cause the augmented reality device at the second enterprise location to display a unique device signature associated with the first device as an augmented-reality user interface element in the at least one augmented-reality user interface.

In some embodiments, sending the one or more commands directing the augmented reality device at the second enterprise location to display the overlay highlighting the user in possession of the first device to the augmented reality device at the second enterprise location may cause the augmented reality device at the second enterprise location to display a timestamp, location identifier, and event-type identifier associated with the first malicious event and the first device as an augmented-reality user interface element in the at least one augmented-reality user interface.

In some embodiments, sending the one or more commands directing the augmented reality device at the second enterprise location to display the overlay highlighting the user in possession of the first device to the augmented reality device at the second enterprise location may cause the augmented reality device at the second enterprise location to display an outline of the user in possession of the first device as an augmented-reality user interface element in the at least one augmented-reality user interface.

In some embodiments, sending the one or more commands directing the augmented reality device at the second enterprise location to display the overlay highlighting the user in possession of the first device to the augmented reality device at the second enterprise location may cause the augmented reality device at the second enterprise location to display an outline of the first device as an augmented-reality user interface element in the at least one augmented-reality user interface.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for detecting and identifying devices at enterprise locations to protect enterprise-managed information and resources in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
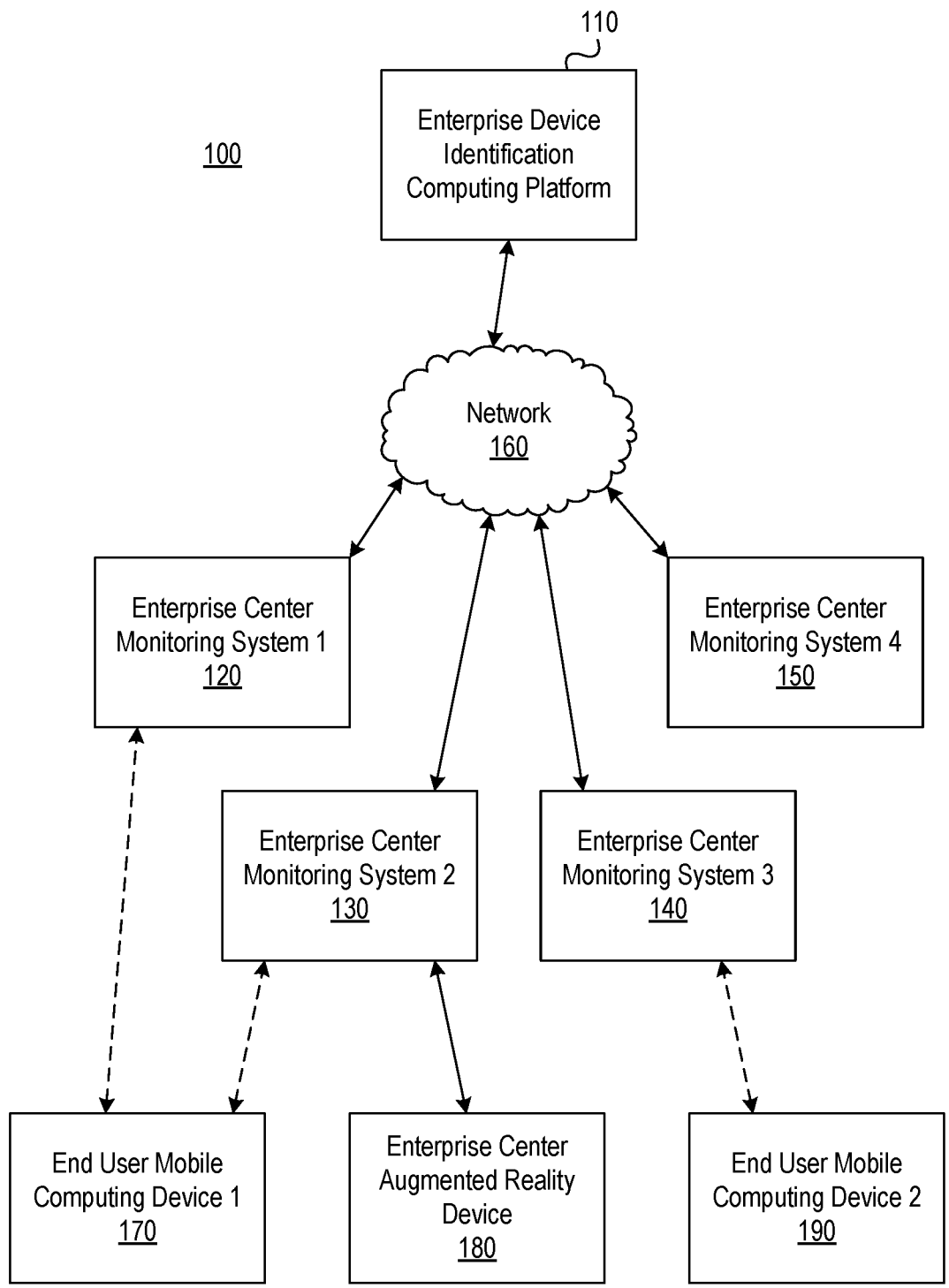
FIGS. 1A and 1B depict an illustrative computing environment for detecting and identifying devices at enterprise locations to protect enterprise-managed information and resources in accordance with one or more example embodiments.
Figure 1B:
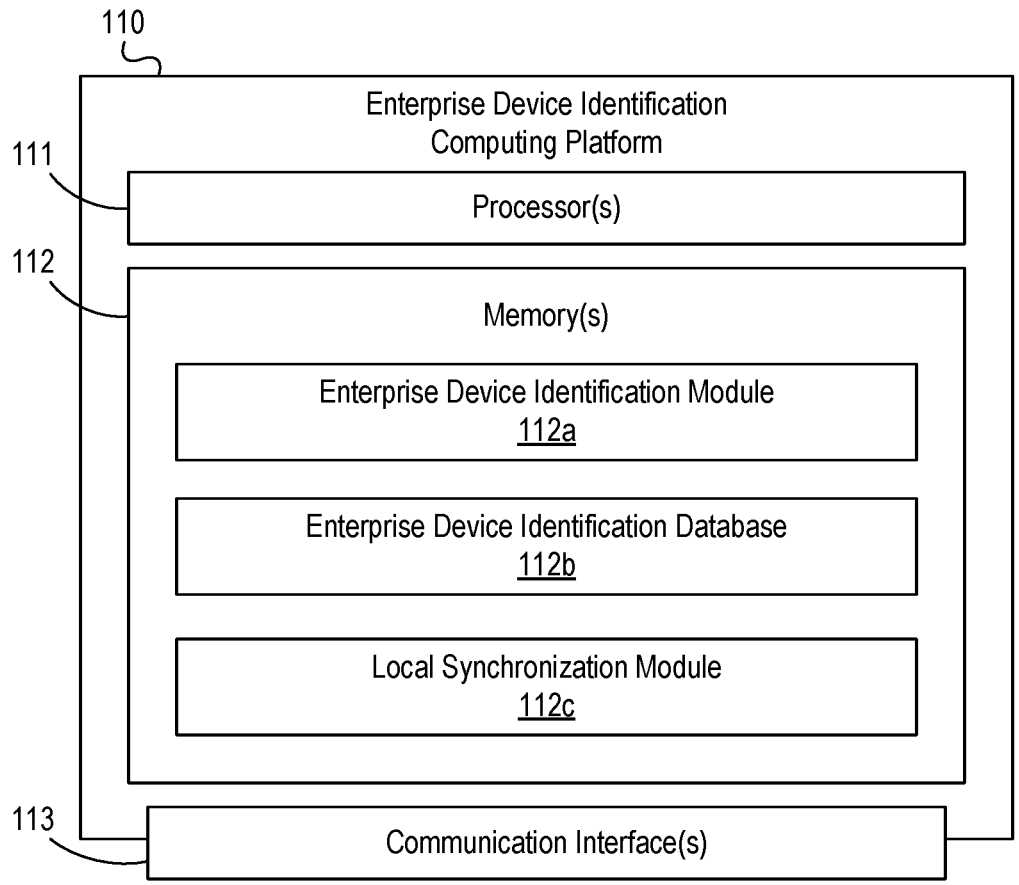

FIGS. 1A and 1B depict an illustrative computing environment for detecting and identifying devices at enterprise locations to protect enterprise-managed information and resources in accordance with one or more example embodiments. Referring to FIG. 1A, computing environment 100 may include one or more computer systems. For example, computing environment 100 may include an enterprise device identification computing platform 110, a first enterprise center monitoring system 120, a second enterprise center monitoring system 130, a third enterprise center monitoring system 140, a fourth enterprise center monitoring system 150, a first end user mobile computing device 170, an enterprise center augmented reality device 180, and a second end user mobile computing device 190.

As illustrated in greater detail below, enterprise device identification computing platform 110 may include one or more computing devices configured to perform one or more of the functions described herein. For example, enterprise device identification computing platform 110 may include one or more computers (e.g., laptop computers, desktop computers, servers, server blades, or the like).

Enterprise center monitoring system 120 may include one or more computing devices and/or other computer components (e.g., processors, memories, communication interfaces). In addition, and as illustrated in greater detail below, enterprise center monitoring system 120 may be configured to receive information from, send information to, and/or otherwise exchange information with one or more devices that are physically present at and/or within a certain range of a first enterprise location (e.g., a banking center, a financial services center, an automated teller machine vestibule, or another enterprise location) at which enterprise center monitoring system 120 may be deployed.

Enterprise center monitoring system 130 may include one or more computing devices and/or other computer components (e.g., processors, memories, communication interfaces). In addition, and as illustrated in greater detail below, enterprise center monitoring system 130 may be configured to receive information from, send information to, and/or otherwise exchange information with one or more devices that are physically present at and/or within a certain range of a second enterprise location (e.g., a banking center, a financial services center, an automated teller machine vestibule, or another enterprise location) at which enterprise center monitoring system 130 may be deployed. The second enterprise location (e.g., where enterprise center monitoring system 130 is deployed) may be remote from and/or different from the first enterprise location (e.g., where enterprise center monitoring system 120 is deployed).

Enterprise center monitoring system 140 may include one or more computing devices and/or other computer components (e.g., processors, memories, communication interfaces). In addition, and as illustrated in greater detail below, enterprise center monitoring system 140 may be configured to receive information from, send information to, and/or otherwise exchange information with one or more devices that are physically present at and/or within a certain range of a third enterprise location (e.g., a banking center, a financial services center, an automated teller machine vestibule, or another enterprise location) at which enterprise center monitoring system 140 may be deployed. The third enterprise location (e.g., where enterprise center monitoring system 140 is deployed) may be remote from and/or different from the first enterprise location (e.g., where enterprise center monitoring system 120 is deployed) and the second enterprise location (e.g., where enterprise center monitoring system 130 is deployed).

Enterprise center monitoring system 150 may include one or more computing devices and/or other computer components (e.g., processors, memories, communication interfaces). In addition, and as illustrated in greater detail below, enterprise center monitoring system 150 may be configured to receive information from, send information to, and/or otherwise exchange information with one or more devices that are physically present at and/or within a certain range of a fourth enterprise location (e.g., a banking center, a financial services center, an automated teller machine vestibule, or another enterprise location) at which enterprise center monitoring system 150 may be deployed. The fourth enterprise location (e.g., where enterprise center monitoring system 150 is deployed) may be remote from and/or different from the first enterprise location (e.g., where enterprise center monitoring system 120 is deployed), the second enterprise location (e.g., where enterprise center monitoring system 130 is deployed), and the third enterprise location (e.g., where enterprise center monitoring system 140 is deployed).

End user mobile computing device 170 may be a mobile computing device (e.g., smartphone, tablet, smart watch, laptop computer, or the like). In addition, end user mobile computing device 170 may be linked to and/or used by a first user (who may, e.g., be a customer or other individual visiting an enterprise location, such as the first enterprise location where enterprise center monitoring system 120 may be deployed or the second enterprise location where enterprise center monitoring system 130 may be deployed). End user mobile computing device 190 also may be a mobile computing device (e.g., smartphone, tablet, smart watch, laptop computer, or the like). In addition, end user mobile computing device 190 may be linked to and/or used by a second user (who may, e.g., be a customer or other individual visiting an enterprise location, such as the third enterprise location where enterprise center monitoring system 140 may be deployed) different from the first user.

Enterprise center augmented reality device 180 may be a computing device (e.g., a desktop computer, laptop computer, tablet, smart television, smart display panel, or the like). In addition, enterprise center augmented reality device 180 may be configured to display and/or otherwise present one or more augmented-reality user interfaces. In some arrangements, enterprise center augmented reality device 180 may be a translucent glass panel with an integrated electronic display, such that a user of enterprise center augmented reality device 180 may be able to look through the glass panel (e.g., to view persons and/or devices on the other side of the glass panel from the user) while also being able to view augmented-reality user interfaces and/or associated elements that are generated and/or displayed by enterprise center augmented reality device 180. Such augmented-reality user interfaces and/or associated elements may, for instance, only be visible on one side of enterprise center augmented reality device 180. In some instances, enterprise center augmented reality device 180 may be deployed at an enterprise location such that the augmented-reality user interfaces and/or associated elements that are generated and/or displayed by enterprise center augmented reality device 180 are only visible to enterprise employees and/or affiliates, while being hidden and/or otherwise not visible to customers, visitors, and/or other individuals who are not enterprise employees and/or affiliates. For instance, enterprise center augmented reality device 180 may be incorporated into a teller window at a banking center, such that the augmented-reality user interfaces and/or associated elements that are generated and/or displayed by enterprise center augmented reality device 180 are only visible to banking center employees, while being hidden and/or otherwise not visible to customers and/or other visitors to the banking center. In some instances, enterprise center augmented reality device 180 also may include one or more sensors and/or wireless communication interfaces that enable enterprise center augmented reality device 180 to detect, locate, and/or otherwise identify one or more specific devices present at a location where enterprise center augmented reality device 180 is deployed. Using such sensors and/or interfaces, enterprise center augmented reality device 180 may, for instance, detect and locate a particular mobile device that is present at the location where enterprise center augmented reality device 180 is deployed and subsequently may display and/or otherwise present one or more augmented-reality user interfaces that include augmented-reality elements outlining and/or otherwise highlighting the detected and located mobile device.

Computing environment 100 also may include one or more networks, which may interconnect one or more of enterprise device identification computing platform 110, enterprise center monitoring system 120, enterprise center monitoring system 130, enterprise center monitoring system 140, enterprise center monitoring system 150, end user mobile computing device 170, enterprise center augmented reality device 180, and end user mobile computing device 190. For example, computing environment 100 may include a network 160 (which may, e.g., interconnect enterprise device identification computing platform 110, enterprise center monitoring system 120, enterprise center monitoring system 130, enterprise center monitoring system 140, enterprise center monitoring system 150, and/or one or more other systems which may be associated with an enterprise organization, such as a financial institution, with one or more other systems, public networks, sub-networks, and/or the like).

In one or more arrangements, enterprise device identification computing platform 110, enterprise center monitoring system 120, enterprise center monitoring system 130, enterprise center monitoring system 140, enterprise center monitoring system 150, end user mobile computing device 170, enterprise center augmented reality device 180, and end user mobile computing device 190 may be any type of computing device capable of receiving a user interface, receiving input via the user interface, and communicating the received input to one or more other computing devices. For example, enterprise device identification computing platform 110, enterprise center monitoring system 120, enterprise center monitoring system 130, enterprise center monitoring system 140, enterprise center monitoring system 150, end user mobile computing device 170, enterprise center augmented reality device 180, end user mobile computing device 190, and/or the other systems included in computing environment 100 may, in some instances, include one or more processors, memories, communication interfaces, storage devices, and/or other components. As noted above, and as illustrated in greater detail below, any and/or all of enterprise device identification computing platform 110, enterprise center monitoring system 120, enterprise center monitoring system 130, enterprise center monitoring system 140, enterprise center monitoring system 150, end user mobile computing device 170, enterprise center augmented reality device 180, and end user mobile computing device 190 may, in some instances, be special-purpose computing devices configured to perform specific functions.

Referring to FIG. 1B, enterprise device identification computing platform 110 may include one or more processor(s) 111, memory(s) 112, and communication interface(s) 113. A data bus may interconnect processor 111, memory 112, and communication interface 113. Communication interface 113 may be a network interface configured to support communication between enterprise device identification computing platform 110 and one or more networks (e.g., network 160 or the like). Memory 112 may include one or more program modules having instructions that when executed by processor 111 cause enterprise device identification computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of enterprise device identification computing platform 110 and/or by different computing devices that may form and/or otherwise make up enterprise device identification computing platform 110. For example, memory 112 may have, store, and/or include an enterprise device identification module 112a, an enterprise device identification database 112b, and a local synchronization module 112c. Enterprise device identification module 112a may have instructions that direct and/or cause enterprise device identification computing platform 110 to detect and identify devices at enterprise locations to protect enterprise-managed information and resources, as discussed in greater detail below. Enterprise device identification database 112b may store information used by enterprise device identification module 112a and/or enterprise device identification computing platform 110 in detecting and identifying devices at enterprise locations to protect enterprise-managed information and resources. Local synchronization module 112c may have instructions that direct and/or cause enterprise device identification computing platform 110 to synchronize device information (which may, e.g., include device signatures and/or other information associated with devices detected at various enterprise locations) with various enterprise center monitoring systems (e.g., enterprise center monitoring system 120, enterprise center monitoring system 130, enterprise center monitoring system 140, enterprise center monitoring system 150) which may be deployed at various enterprise locations.

Figure 1C:
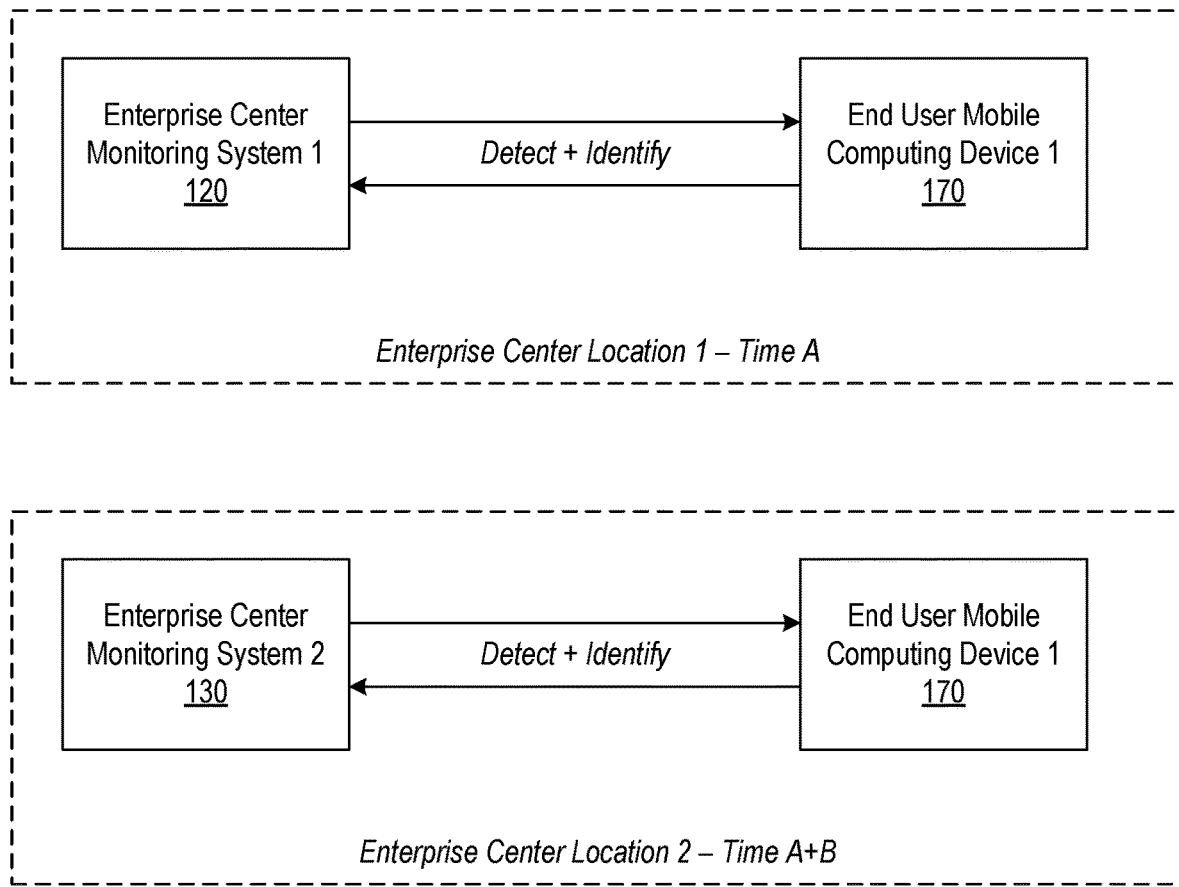
FIG. 1C depicts an illustrative device detection sequence for detecting and identifying devices at enterprise locations to protect enterprise-managed information and resources in accordance with one or more example embodiments.

FIG. 1C depicts an illustrative device detection sequence for detecting and identifying devices at enterprise locations to protect enterprise-managed information and resources in accordance with one or more example embodiments. As seen in FIG. 1C, at a first point in time (e.g., time A), end user mobile computing device 170 may be detected and identified by enterprise center monitoring system 120 as being present at a first enterprise center location. In some instances, such detection and/or identification may occur during and/or shortly after a malicious event at the first enterprise center location. As discussed in greater detail below, enterprise center monitoring system 120 may provide, to enterprise device identification computing platform 110, information indicating that end user mobile computing device 170 has been detected and identified by enterprise center monitoring system 120 as being present at the first enterprise center location. Subsequently, at a second point in time after the first point in time (e.g., time A+B), end user mobile computing device 170 may be detected and identified by enterprise center monitoring system 130 as being present at a second enterprise center location different from the first enterprise center location. Enterprise center monitoring system 130 then may provide, to enterprise device identification computing platform 110, information indicating that end user mobile computing device 170 has been detected and identified by enterprise center monitoring system 130 as being present at the second enterprise center location. As discussed in greater detail below, this information may trigger enterprise device identification computing platform 110 to generate one or more alerts (which may, e.g., be sent to enterprise center monitoring system 130 and/or other systems and/or devices) and/or execute other actions. Additionally or alternatively, information maintained by enterprise device identification computing platform 110 may be shared with enterprise center monitoring system 130, which may generate one or more augmented reality user interfaces highlighting end user mobile computing device 170 and/or a user of end user mobile computing device 170.

Figure 2A:
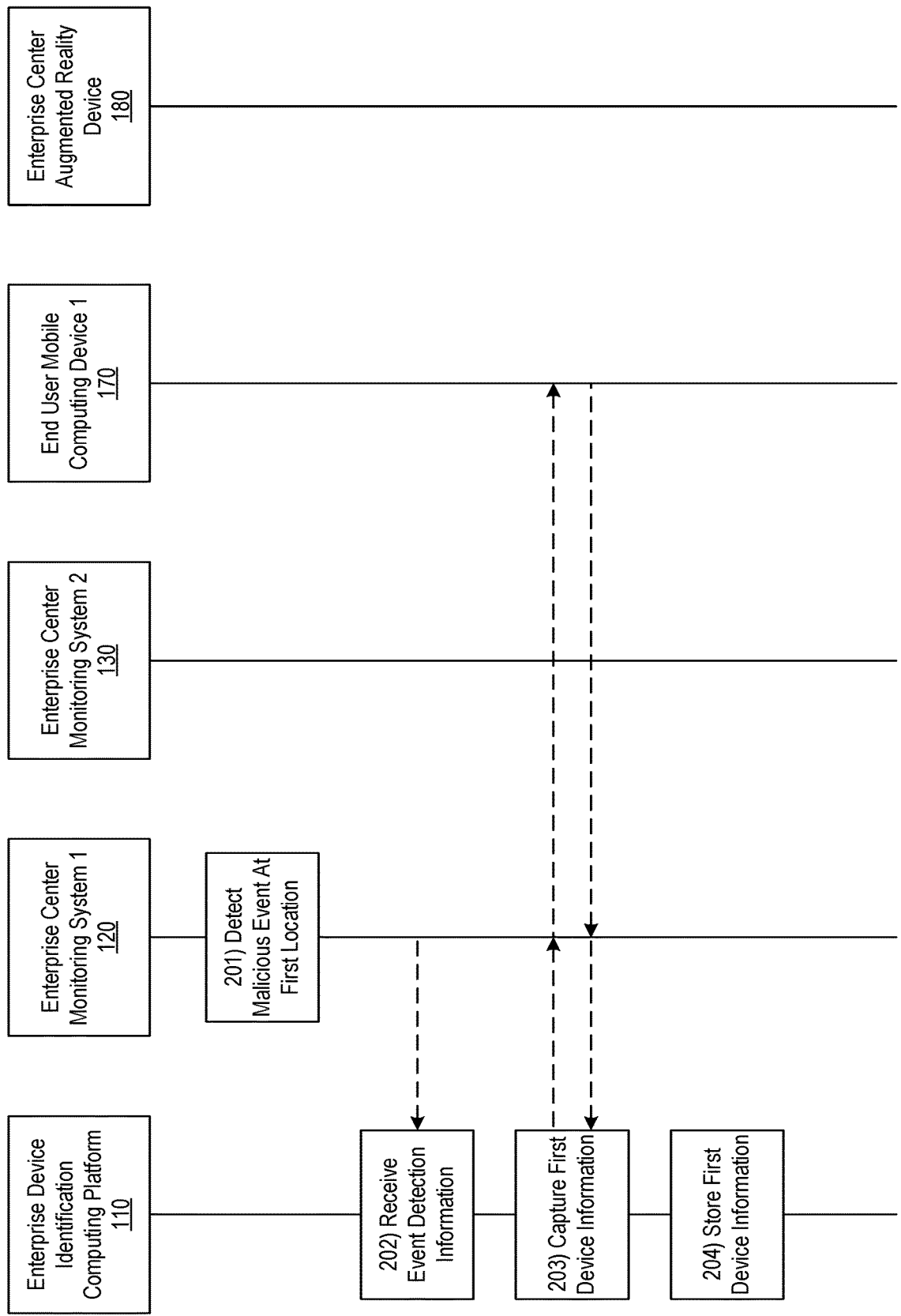
Figure 4:
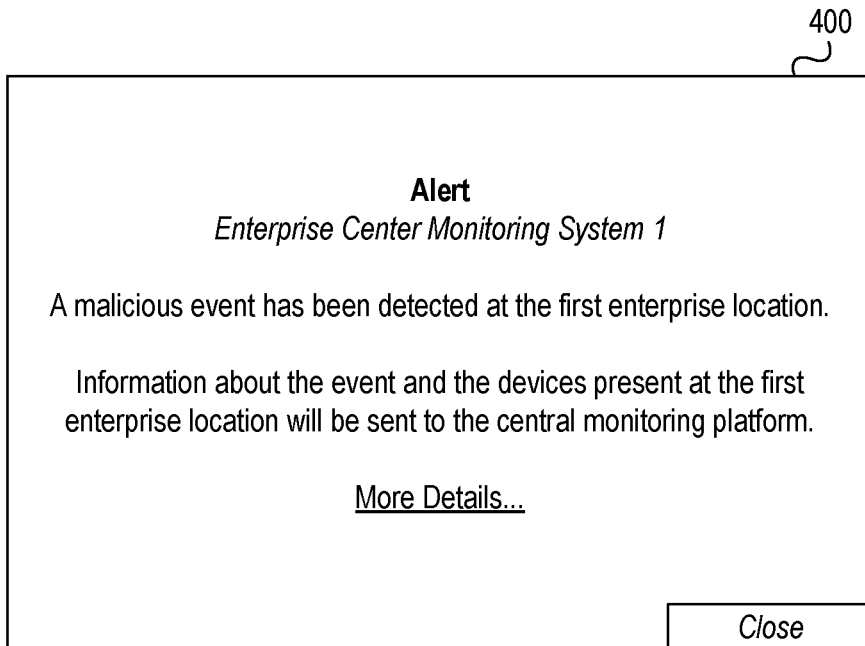
FIGS. 4-7 depict example graphical user interfaces for detecting and identifying devices at enterprise locations to protect enterprise-managed information and resources in accordance with one or more example embodiments

FIGS. 2A-2D depict an illustrative event sequence for detecting and identifying devices at enterprise locations to protect enterprise-managed information and resources in accordance with one or more example embodiments. Referring to FIG. 2A, at step 201, enterprise center monitoring system 120 may detect a malicious event at a first location. For example, at step 201, enterprise center monitoring system 120 may detect a malicious event at the first enterprise location where enterprise center monitoring system 120 is deployed. In some instances, the malicious event may, for instance, correspond to an attempt to access and/or utilize an account (e.g., a financial account) without authorization, an attempt to access and/or take possession of resources (e.g., contents of a safe, safety deposit box, or other physical resources) without authorization, and/or other improper activity at the enterprise location. In some instances, after detecting the malicious event at the first location, enterprise center monitoring system 120 may display, present and/or cause another device to display and/or present a graphical user interface similar to graphical user interface 400, which is illustrated in FIG. 4. As seen in FIG. 4, graphical user interface 400 may include text and/or other content indicating that device information will be shared with enterprise device identification computing platform 110 (e.g., "A malicious event has been detected at the first enterprise location. Information about the event and the devices present at the first enterprise location will be sent to the central monitoring platform.").

At step 202, enterprise device identification computing platform 110 may receive event detection information from enterprise center monitoring system 120. For example, at step 202, enterprise device identification computing platform 110 may receive, via the communication interface (e.g., communication interface 113), from a first enterprise center monitoring system (e.g., enterprise center monitoring system 120) associated with a first enterprise location, information indicating that a first malicious event has been detected at the first enterprise location.

In some embodiments, receiving the information indicating that the first malicious event has been detected at the first enterprise location may include receiving information indicating that the first malicious event has been detected at a staffed enterprise service center. For example, in receiving the information indicating that the first malicious event has been detected at the first enterprise location at step 202, enterprise device identification computing platform 110 may receive information indicating that the first malicious event has been detected at a staffed enterprise service center (e.g., a banking center location where one or more bank employees are present to assist customers).

In some embodiments, receiving the information indicating that the first malicious event has been detected at the first enterprise location may include receiving information indicating that the first malicious event has been detected at an automated enterprise service center. For example, in receiving the information indicating that the first malicious event has been detected at the first enterprise location at step 202, enterprise device identification computing platform 110 may receive information indicating that the first malicious event has been detected at an automated enterprise service center (e.g., an automated teller machine location where no bank employees are present to assist customers).

At step 203, enterprise device identification computing platform 110 may capture first device information. For example, at step 203, in response to receiving the information indicating that the first malicious event has been detected at the first enterprise location, enterprise device identification computing platform 110 may capture first device information identifying a first plurality of devices present at the first enterprise location during a time period corresponding to the first malicious event. For instance, enterprise device identification computing platform 110 may capture first device information identifying various devices, including end user mobile computing device 170, as being present at the first enterprise location where enterprise center monitoring system 120 is deployed during the time period corresponding to the first malicious event.

In some embodiments, capturing the first device information identifying the first plurality of devices present at the first enterprise location during the time period corresponding to the first malicious event may include: generating one or more commands directing the first enterprise center monitoring system to scan for devices present at the first enterprise location; and sending, to the first enterprise center monitoring system, the one or more commands directing the first enterprise center monitoring system to scan for devices present at the first enterprise location. For example, in capturing the first device information identifying the first plurality of devices present at the first enterprise location during the time period corresponding to the first malicious event at step 203, enterprise device identification computing platform 110 may generate one or more commands directing the first enterprise center monitoring system (e.g., enterprise center monitoring system 120) to scan for devices present at the first enterprise location where enterprise center monitoring system 120 is deployed. Subsequently, enterprise device identification computing platform 110 may send, to the first enterprise center monitoring system (e.g., enterprise center monitoring system 120), the one or more commands directing the first enterprise center monitoring system (e.g., enterprise center monitoring system 120) to scan for devices present at the first enterprise location. This sending may, for instance, cause enterprise center monitoring system 120 to scan for devices present at the first enterprise location and report results of the scanning back to enterprise device identification computing platform 110.

In some embodiments, capturing the first device information identifying the first plurality of devices present at the first enterprise location during the time period corresponding to the first malicious event may include: receiving, from the first enterprise center monitoring system, forensic data associated with one or more devices that have scanned for available wireless connections at the first enterprise location. For example, in capturing the first device information identifying the first plurality of devices present at the first enterprise location during the time period corresponding to the first malicious event at step 203, enterprise device identification computing platform 110 may receive, from the first enterprise center monitoring system (e.g., enterprise center monitoring system 120), forensic data associated with one or more devices that have scanned for available wireless connections at the first enterprise location where enterprise center monitoring system 120 is deployed. For instance, such devices may have scanned for available wireless connections at the first enterprise location where enterprise center monitoring system 120 is deployed at times during and/or within a certain time window of the malicious event, and enterprise center monitoring system 120 may have detected and/or recorded forensic information associated with such scanning (e.g., unique device signatures, timestamps, or the like).

In some embodiments, capturing the first device information identifying the first plurality of devices present at the first enterprise location during the time period corresponding to the first malicious event may include: capturing information identifying at least one device present at the first enterprise location before the time period corresponding to the first malicious event; and capturing information identifying at least one device present at the first enterprise location after the time period corresponding to the first malicious event. For example, in capturing the first device information identifying the first plurality of devices present at the first enterprise location during the time period corresponding to the first malicious event at step 203, enterprise device identification computing platform 110 may capture information identifying at least one device present at the first enterprise location before the time period corresponding to the first malicious event, and enterprise device identification computing platform 110 may capture information identifying at least one device present at the first enterprise location after the time period corresponding to the first malicious event. For instance, enterprise device identification computing platform 110 may record and/or otherwise capture information associated with devices detected to be present before the event and after the event (e.g., to ensure completeness of the captured device information). In some instances, enterprise device identification computing platform 110 may assign a scaling score to detected devices based on their temporal proximity to the malicious event, such that devices which were detected at times closest to the malicious event are assigned a relatively higher scaling score while devices which were detected at times farther from the malicious event are assigned a relatively lower scaling score, thereby enabling enterprise device identification computing platform 110 to perform risk-based calculations with respect to specific devices.

At step 204, enterprise device identification computing platform 110 may store the first device information. For example, at step 204, enterprise device identification computing platform 110 may store the first device information identifying the first plurality of devices present at the first enterprise location during the time period corresponding to the first malicious event.

In some embodiments, storing the first device information identifying the first plurality of devices present at the first enterprise location during the time period corresponding to the first malicious event may include: generating a unique device signature for each device of the first plurality of devices present at the first enterprise location during the time period corresponding to the first malicious event; and storing the unique device signature generated for each device of the first plurality of devices present at the first enterprise location during the time period corresponding to the first malicious event. For example, in storing the first device information identifying the first plurality of devices present at the first enterprise location during the time period corresponding to the first malicious event at step 204, enterprise device identification computing platform 110 may generate a unique device signature for each device of the first plurality of devices present at the first enterprise location during the time period corresponding to the first malicious event. For instance, enterprise device identification computing platform 110 may generate such a unique device signature for each device of the first plurality of devices based on a media access control (MAC) address associated with a wireless interface of each device of the first plurality of devices. Subsequently, enterprise device identification computing platform 110 may store the unique device signature generated for each device of the first plurality of devices present at the first enterprise location during the time period corresponding to the first malicious event.

In some embodiments, storing the first device information identifying the first plurality of devices present at the first enterprise location during the time period corresponding to the first malicious event may include: storing a timestamp, location identifier, and event-type identifier for each device of the first plurality of devices present at the first enterprise location during the time period corresponding to the first malicious event. For example, in storing the first device information identifying the first plurality of devices present at the first enterprise location during the time period corresponding to the first malicious event at step 204, enterprise device identification computing platform 110 may store a timestamp, location identifier, and event-type identifier for each device of the first plurality of devices present at the first enterprise location during the time period corresponding to the first malicious event.

In some embodiments, storing the first device information identifying the first plurality of devices present at the first enterprise location during the time period corresponding to the first malicious event may include: filtering out at least one enterprise-affiliated device from the first plurality of devices present at the first enterprise location during the time period corresponding to the first malicious event. For example, in storing the first device information identifying the first plurality of devices present at the first enterprise location during the time period corresponding to the first malicious event at step 204, enterprise device identification computing platform 110 may filter out at least one enterprise-affiliated device from the first plurality of devices present at the first enterprise location during the time period corresponding to the first malicious event. For instance, enterprise device identification computing platform 110 may remove, from the first device information, data associated with any devices that are owned by, used by, and/or otherwise linked to one or more enterprise users (e.g., employees and/or other enterprise users present at the first enterprise location, which may, e.g., be a banking center) while preserving data associated with other devices (which may, e.g., used by and/or linked to customers and/or other visitors to the enterprise location).

Figure 2B:
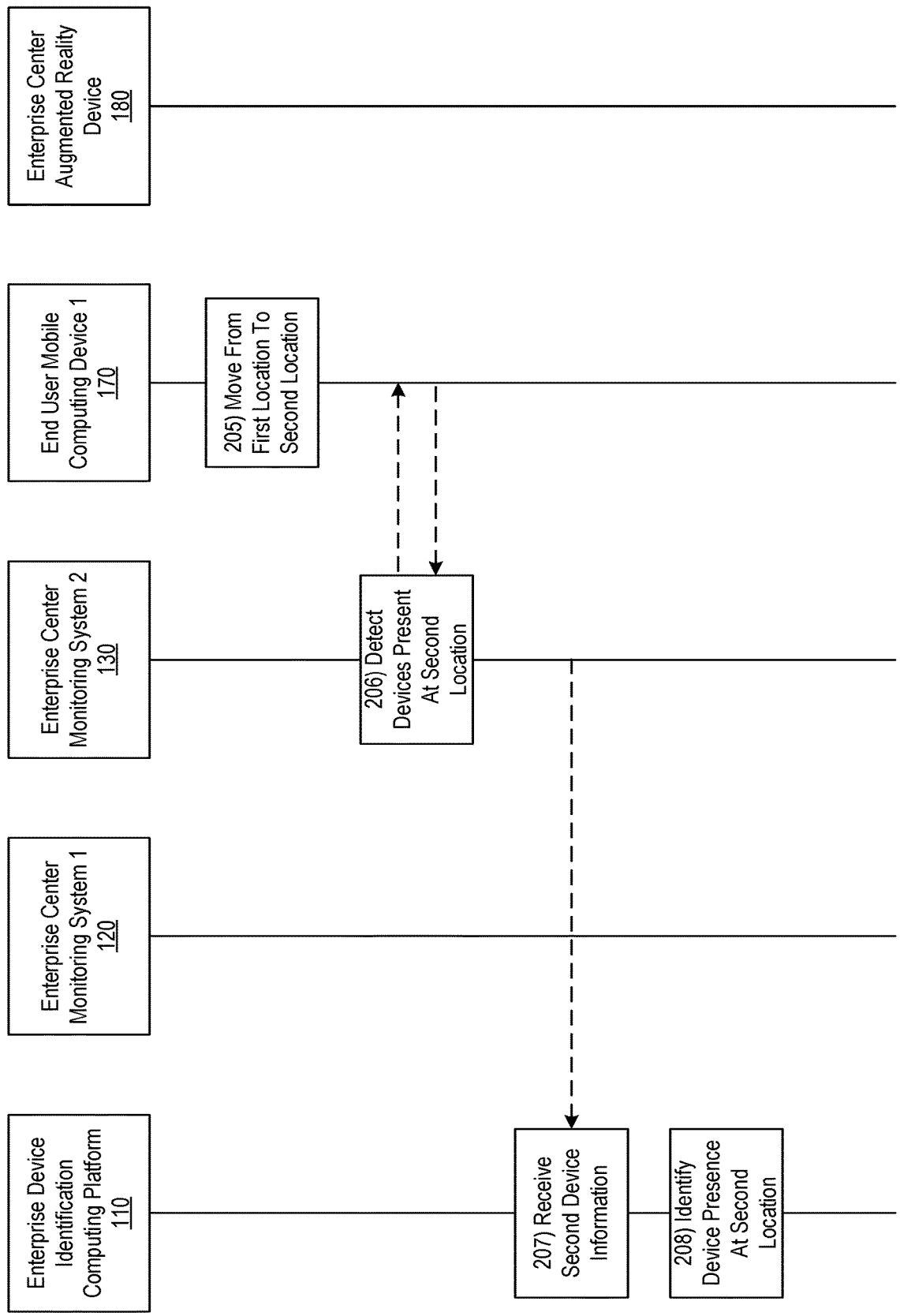

Referring to FIG. 2B, at step 205, end user mobile computing device 170 may move from the first enterprise location (e.g., where enterprise center monitoring system 120 is deployed) to a second enterprise location (e.g., where enterprise center monitoring system 130 is deployed). For instance, the user in possession of end user mobile computing device 170 and/or otherwise linked to end user mobile computing device 170 may leave the first enterprise location, and after a period of time elapses, enter and/or otherwise visit the second enterprise location.

At step 206, enterprise center monitoring system 130 may detect one or more devices that are present at the second enterprise location. For instance, enterprise center monitoring system 130 may be configured to periodically scan for devices that are present at the second enterprise location where enterprise center monitoring system 130 is deployed, and based on such scanning, enterprise center monitoring system 130 may identify and/or otherwise detect one or more devices as being within wireless transmission range of and/or otherwise present at the second enterprise location. Enterprise center monitoring system 130 may, for instance, perform such periodic scanning every hour, every minute, every ten seconds, or at another interval. After performing such scanning and detecting the one or more devices that are present at the second enterprise location, enterprise center monitoring system 130 may send, to enterprise device identification computing platform 110, device information identifying the one or more detected devices.

At step 207, enterprise device identification computing platform 110 may receive the device information from enterprise center monitoring system 130. For example, at step 207, after storing the first device information identifying the first plurality of devices present at the first enterprise location during the time period corresponding to the first malicious event, enterprise device identification computing platform 110 may receive, via the communication interface (e.g., communication interface 113), from a second enterprise center monitoring system (e.g., enterprise center monitoring system 130) associated with a second enterprise location, second device information identifying a second plurality of devices present at the second enterprise location.

In some embodiments, receiving the second device information identifying the second plurality of devices present at the second enterprise location may include receiving, from the second enterprise center monitoring system, forensic data associated with one or more devices that have scanned for available wireless connections at the second enterprise location. For example, in receiving the second device information identifying the second plurality of devices present at the second enterprise location at step 207, enterprise device identification computing platform 110 may receive, from the second enterprise center monitoring system (e.g., enterprise center monitoring system 130), forensic data associated with one or more devices that have scanned for available wireless connections at the second enterprise location where enterprise center monitoring system 130 is deployed. For instance, such devices may have scanned for available wireless connections at the second enterprise location where enterprise center monitoring system 130 is deployed at times within a certain time window, and enterprise center monitoring system 130 may have detected and/or recorded forensic information associated with such scanning (e.g., unique device signatures, timestamps, or the like).

At step 208, enterprise device identification computing platform 110 may identify device presence at the second enterprise location. For example, at step 208, enterprise device identification computing platform 110 may identify that a first device (e.g., end user mobile computing device 170) of the first plurality of devices present at the first enterprise location during the time period corresponding to the first malicious event is present at the second enterprise location based on the second device information received from the second enterprise center monitoring system (e.g., enterprise center monitoring system 130) associated with the second enterprise location. For instance, enterprise device identification computing platform 110 may identify that end user mobile computing device 170 (which may, e.g., have been present at the first enterprise location during the first malicious event) is now present at the second enterprise location where enterprise center monitoring system 130 is deployed. Based on this identification, enterprise device identification computing platform 110 may generate one or more alerts and/or execute other actions, as illustrated below, because there might be a possibility that end user mobile computing device 170 and/or a user of end user mobile computing device 170 was a cause of and/or otherwise associated with the malicious event. This identification and the subsequent alerts and/or other actions also may be executed by enterprise device identification computing platform 110 with respect to other devices from the first plurality of devices being detect at the second enterprise location and/or at other enterprise locations (e.g., the third enterprise location where enterprise center monitoring system 140 is deployed, the fourth enterprise location where enterprise center monitoring system 150 is deployed, and/or other locations).

In some embodiments, identifying that the first device of the first plurality of devices present at the first enterprise location during the time period corresponding to the first malicious event is present at the second enterprise location may include: identifying that the first device of the first plurality of devices present at the first enterprise location during the time period corresponding to the first malicious event is present at the second enterprise location based on a unique device signature generated for the first device of the first plurality of devices present at the first enterprise location during the time period corresponding to the first malicious event. For example, in identifying that the first device (e.g., end user mobile computing device 170) of the first plurality of devices present at the first enterprise location during the time period corresponding to the first malicious event is present at the second enterprise location at step 208, enterprise device identification computing platform 110 may identify that the first device (e.g., end user mobile computing device 170) of the first plurality of devices present at the first enterprise location during the time period corresponding to the first malicious event is present at the second enterprise location based on a unique device signature generated for the first device (e.g., end user mobile computing device 170) of the first plurality of devices present at the first enterprise location during the time period corresponding to the first malicious event. For instance, enterprise device identification computing platform 110 may have generated a unique device signature for end user mobile computing device 170 when end user mobile computing device 170 was detected at the first enterprise location (e.g., by enterprise center monitoring system 120), and at step 208, enterprise device identification computing platform 110 may recognize the unique device signature for end user mobile computing device 170 when end user mobile computing device 170 is now being detected at the second enterprise location (e.g., by enterprise center monitoring system 130).

Referring to FIG. 2C, at step 209, enterprise device identification computing platform 110 may generate an alert. For example, at step 209, in response to identifying that the first device (e.g., end user mobile computing device 170) of the first plurality of devices present at the first enterprise location during the time period corresponding to the first malicious event is present at the second enterprise location, enterprise device identification computing platform 110 may generate an alert indicating that the first device (e.g., end user mobile computing device 170) of the first plurality of devices is present at the second enterprise location and was present at the first enterprise location during the time period corresponding to the first malicious event. Such an alert may, for instance, include text and/or other content warning one or more enterprise employees at the second enterprise location that end user mobile computing device 170 and/or the user of end user mobile computing device 170 might have been a cause of and/or otherwise associated with the malicious event at the first enterprise location.

In some embodiments, generating the alert indicating that the first device of the first plurality of devices is present at the second enterprise location and was present at the first enterprise location during the time period corresponding to the first malicious event may include: inserting a timestamp, location identifier, and event-type identifier obtained from the first device information into the alert indicating that the first device of the first plurality of devices is present at the second enterprise location and was present at the first enterprise location during the time period corresponding to the first malicious event. For example, in generating the alert indicating that the first device (e.g., end user mobile computing device 170) of the first plurality of devices is present at the second enterprise location and was present at the first enterprise location during the time period corresponding to the first malicious event at step 209, enterprise device identification computing platform 110 may insert a timestamp, location identifier, and event-type identifier obtained from the first device information into the alert indicating that the first device (e.g., end user mobile computing device 170) of the first plurality of devices is present at the second enterprise location and was present at the first enterprise location during the time period corresponding to the first malicious event. The timestamp may, for instance, include information identifying a specific date and time at which end user mobile computing device 170 was detected at the first enterprise location. The location identifier may, for instance, include information identifying the first enterprise location and/or a specific position within the first enterprise location where end user mobile computing device 170 was detected. The event-type identifier may, for instance, include information identifying an event type associated with the first malicious event, such as an attempt to access and/or utilize an account (e.g., a financial account) without authorization, an attempt to access and/or take possession of resources (e.g., contents of a safe, safety deposit box, or other physical resources) without authorization, and/or other improper activity at the enterprise location.

Figure 5:
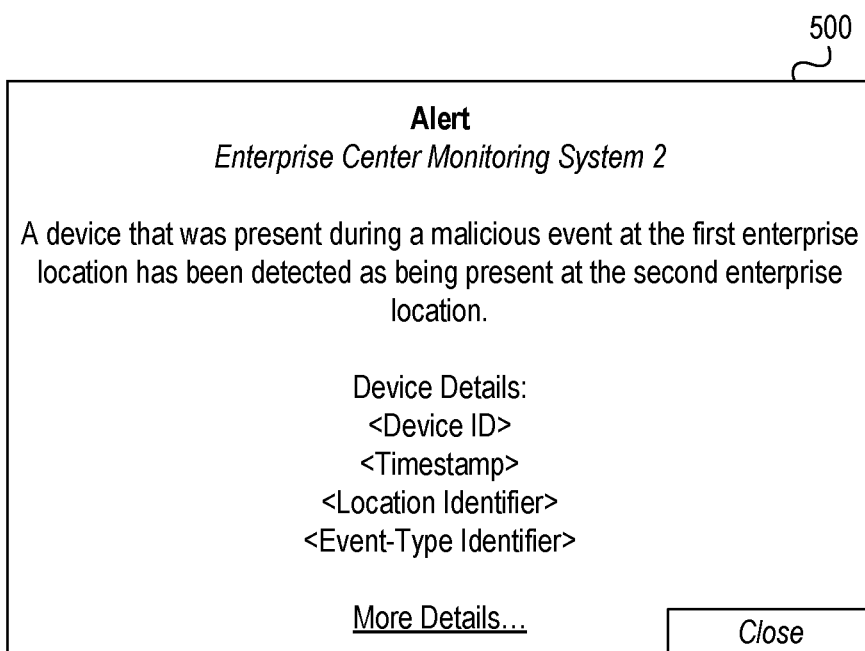

At step 210, enterprise device identification computing platform 110 may send the alert to enterprise center monitoring system 130. For example, at step 210, enterprise device identification computing platform 110 may send, via the communication interface (e.g., communication interface 113), to the second enterprise center monitoring system (e.g., enterprise center monitoring system 130) associated with the second enterprise location, the alert indicating that the first device (e.g., end user mobile computing device 170) of the first plurality of devices is present at the second enterprise location and was present at the first enterprise location during the time period corresponding to the first malicious event. In some instances, in sending the alert to enterprise center monitoring system 130, enterprise device identification computing platform 110 may cause enterprise center monitoring system 130 to display, present, and/or cause another device at the second enterprise location to display and/or present a graphical user interface similar to graphical user interface 500, which is illustrated in FIG. 5. As seen in FIG. 5, graphical user interface 500 may include text and/or other content indicating the first device (e.g., end user mobile computing device 170) of the first plurality of devices is present at the second enterprise location and was present at the first enterprise location during the time period corresponding to the first malicious event (e.g., "A device that was present during a malicious event at the first enterprise location has been detected as being present at the second enterprise location. Device Details: <Device ID>; <Timestamp>; <Location Identifier>; <Event-Type Identifier>; More Details . . . ").

At step 211, enterprise device identification computing platform 110 may generate one or more image capture commands. For example, at step 211, in response to identifying that the first device (e.g., end user mobile computing device 170) of the first plurality of devices present at the first enterprise location during the time period corresponding to the first malicious event is present at the second enterprise location, enterprise device identification computing platform 110 may generate one or more commands directing a video surveillance system at the second enterprise location to capture one or more images of a user in possession of the first device (e.g., end user mobile computing device 170). Such commands may, for instance, include device signature information that enables the video surveillance system at the second enterprise location to identify end user mobile computing device 170 and/or the user of end user mobile computing device 170 to facilitate the image capture. Additionally or alternatively, such commands may include position information enables the video surveillance system at the second enterprise location to determine a current location of end user mobile computing device 170 and/or the user of end user mobile computing device 170 to facilitate the image capture.

At step 212, enterprise device identification computing platform 110 may send the one or more image capture commands to the video surveillance system. For example, at step 212, enterprise device identification computing platform 110 may send, via the communication interface (e.g., communication interface 113), to the video surveillance system at the second enterprise location, the one or more commands directing the video surveillance system at the second enterprise location to capture the one or more images of the user in possession of the first device (e.g., end user mobile computing device 170). In addition, by sending the one or more commands directing the video surveillance system at the second enterprise location to capture the one or more images of the user in possession of the first device (e.g., end user mobile computing device 170) to the video surveillance system at the second enterprise location, enterprise device identification computing platform 110 may cause the video surveillance system at the second enterprise location to take and store the one or more images of the user in possession of the first device (e.g., end user mobile computing device 170). For instance, the video surveillance system at the second enterprise location may take and store the one or more images of the user in possession of the first device (e.g., end user mobile computing device 170) based on device signature information and/or position information sent to the video surveillance system at the second enterprise location by enterprise device identification computing platform 110. The video surveillance system at the second enterprise location subsequently may report any and/or all of the captured images and/or video associated with the user in possession of end user mobile computing device 170 back to enterprise device identification computing platform 110.

Referring to FIG. 2D, at step 213, enterprise device identification computing platform 110 may generate one or more dwell time capture commands. For example, at step 213, in response to identifying that the first device (e.g., end user mobile computing device 170) of the first plurality of devices present at the first enterprise location during the time period corresponding to the first malicious event is present at the second enterprise location, enterprise device identification computing platform 110 may generate one or more commands directing the second enterprise center monitoring system (e.g., enterprise center monitoring system 130) associated with the second enterprise location to track dwell time statistics associated with a user in possession of the first device (e.g., end user mobile computing device 170). Such dwell time statistics may, for instance, identify specific times in which the user in possession of end user mobile computing device 170 was in specific sub-areas of the enterprise location, such as a check-in area, a waiting area, specific rooms/offices, specific exterior areas, or the like.

At step 214, enterprise device identification computing platform 110 may send the one or more dwell time capture commands to enterprise center monitoring system 130. For example, at step 214, enterprise device identification computing platform 110 may send, via the communication interface (e.g., communication interface 113), to the second enterprise center monitoring system (e.g., enterprise center monitoring system 130) associated with the second enterprise location, the one or more commands directing the second enterprise center monitoring system (e.g., enterprise center monitoring system 130) associated with the second enterprise location to track the dwell time statistics associated with the user in possession of the first device (e.g., end user mobile computing device 170). For instance, the commands may cause enterprise center monitoring system 130 to record and/or otherwise track specific times in which the user in possession of end user mobile computing device 170 was in specific sub-areas of the enterprise location, such as a check-in area, a waiting area, specific rooms/offices, specific exterior areas, or the like. Enterprise center monitoring system 130 subsequently may report any and/or all of the dwell time statistics associated with the user in possession of end user mobile computing device 170 back to enterprise device identification computing platform 110.

At step 215, enterprise device identification computing platform 110 may generate one or more motion tracking commands. For example, at step 215, in response to identifying that the first device (e.g., end user mobile computing device 170) of the first plurality of devices present at the first enterprise location during the time period corresponding to the first malicious event is present at the second enterprise location, enterprise device identification computing platform 110 may generate one or more commands directing the second enterprise center monitoring system (e.g., enterprise center monitoring system 130) associated with the second enterprise location to track motion pattern data associated with a user in possession of the first device (e.g., end user mobile computing device 170). Such motion pattern data may, for instance, identify specific routes and/or other motion patterns in which the user in possession of end user mobile computing device 170 moved through different sub-areas of the enterprise location, such as an order and/or pattern in which the user in possession of end user mobile computing device 170 visited a check-in area, a waiting area, specific rooms/offices, specific exterior areas, or the like.

At step 216, enterprise device identification computing platform 110 may send the one or more motion tracking commands to enterprise center monitoring system 130. For example, at step 216, enterprise device identification computing platform 110 may send, via the communication interface (e.g., communication interface 113), to the second enterprise center monitoring system (e.g., enterprise center monitoring system 130) associated with the second enterprise location, the one or more commands directing the second enterprise center monitoring system (e.g., enterprise center monitoring system 130) associated with the second enterprise location to track the motion pattern data associated with the user in possession of the first device (e.g., end user mobile computing device 170). For instance, the commands may cause enterprise center monitoring system 130 to record and/or otherwise track specific routes and/or other motion patterns via which the user in possession of end user mobile computing device 170 moves through different sub-areas of the enterprise location, such as an order and/or pattern in which the user in possession of end user mobile computing device 170 visits a check-in area, a waiting area, specific rooms/offices, specific exterior areas, or the like. Enterprise center monitoring system 130 subsequently may report any and/or all of the motion pattern data associated with the user in possession of end user mobile computing device 170 back to enterprise device identification computing platform 110.

Subsequently, enterprise device identification computing platform 110 and/or the other systems and devices described above may repeat similar steps as those described above as end user mobile computing device 170 and/or other devices present at the first enterprise location during the malicious event are detected at other enterprise locations. For instance, similar steps may be executed if end user mobile computing device 170 then visits a third enterprise location where enterprise center monitoring system 140 is deployed. Additionally or alternatively, similar steps may be executed if another device present at the first enterprise location during the malicious event is detected at the second enterprise location where enterprise center monitoring system 130 is deployed and/or at one or more other enterprise locations.

Figure 3A:
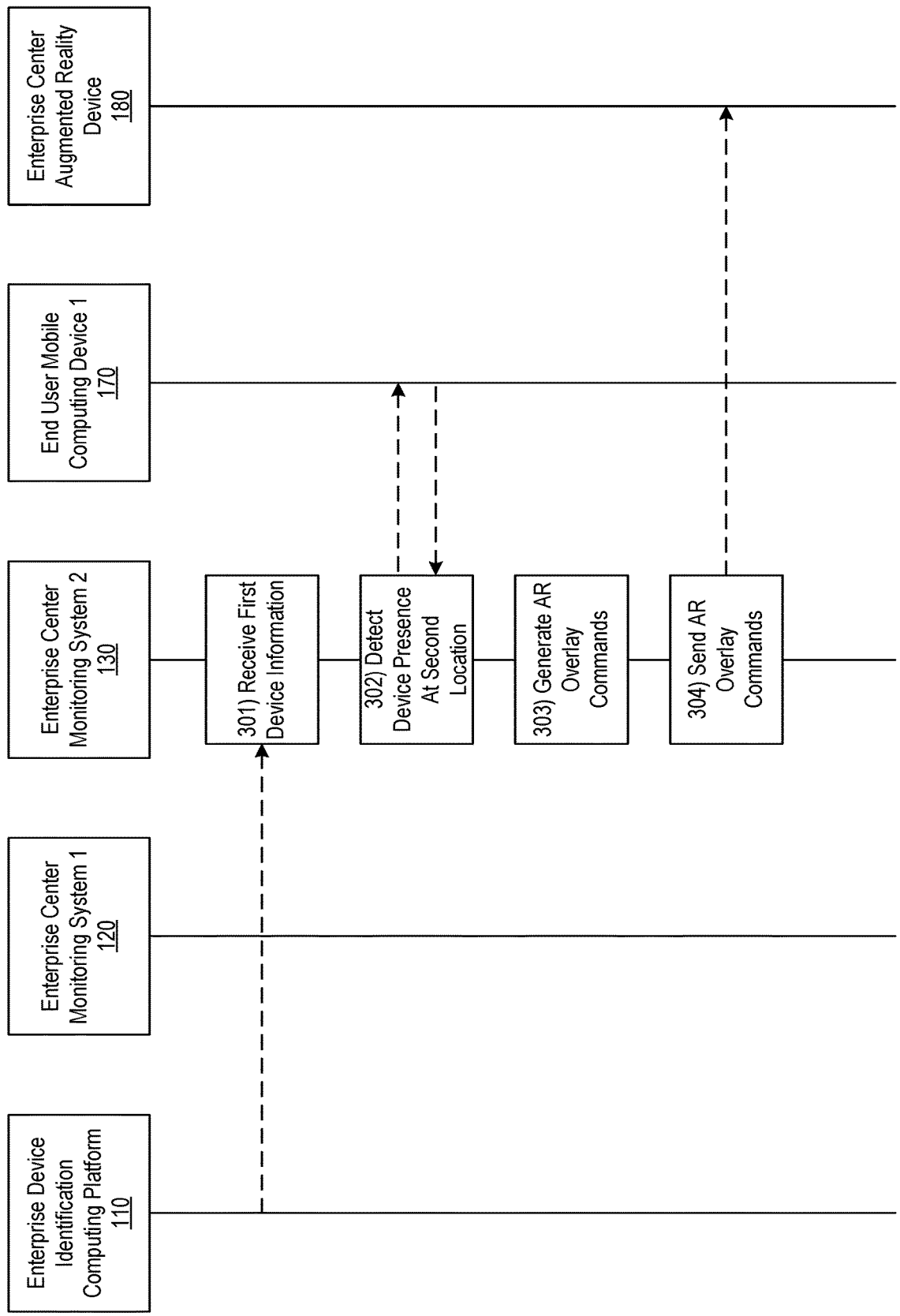
FIGS. 3A and 3B depict another illustrative event sequence for detecting and identifying devices at enterprise locations to protect enterprise-managed information and resources in accordance with one or more example embodiments.
Figure 3B:
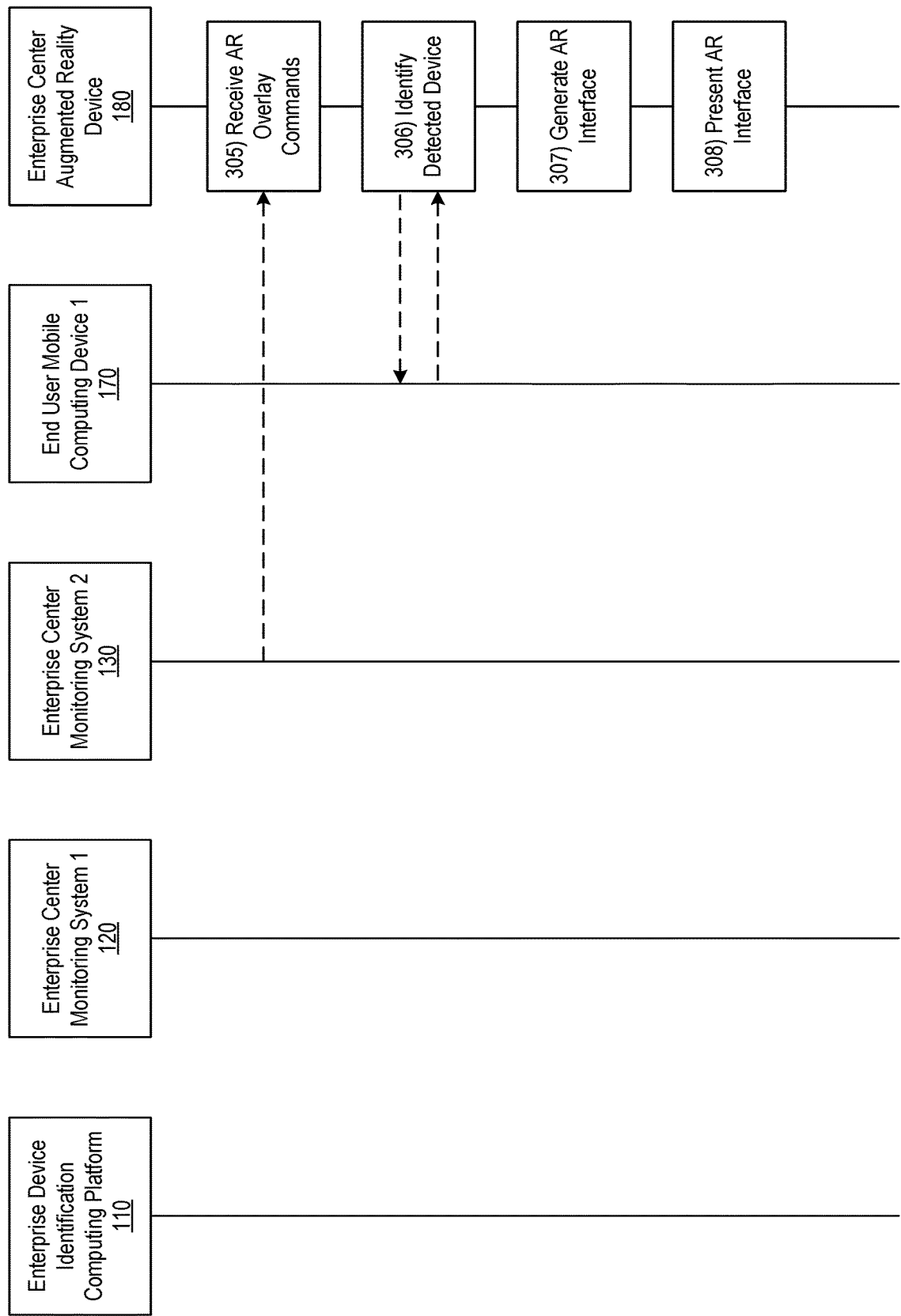

FIGS. 3A and 3B depict another illustrative event sequence for detecting and identifying devices at enterprise locations to protect enterprise-managed information and resources in accordance with one or more example embodiments. Referring to FIG. 3A, at step 301, enterprise center monitoring system 130 may receive first device information from enterprise device identification computing platform 110. For example, at step 301, enterprise center monitoring system 130 may receive, via the communication interface (e.g., communication interface 113), from an enterprise device identification computing platform (e.g., enterprise device identification computing platform 110), first device information identifying a first plurality of devices present at a first enterprise location during a time period corresponding to a first malicious event. For instance, enterprise center monitoring system 130 may receive any and/or all of the device information captured by enterprise center monitoring system 120 at step 203 in the illustrative event sequence described above and/or other, similar device information captured by enterprise center monitoring system 120 and/or other enterprise center monitoring systems included in computing environment 100.

In some embodiments, receiving the first device information identifying the first plurality of devices present at the first enterprise location during the time period corresponding to the first malicious event may include receiving device data captured by the enterprise device identification computing platform from a monitoring system different from the enterprise center monitoring system. For example, in receiving the first device information identifying the first plurality of devices present at the first enterprise location during the time period corresponding to the first malicious event at step 301, enterprise center monitoring system 130 may receive device data captured by the enterprise device identification computing platform (e.g., enterprise device identification computing platform 110) from a monitoring system (e.g., enterprise center monitoring system 120, enterprise center monitoring system 140, enterprise center monitoring system 150) different from the enterprise center monitoring system (e.g., enterprise center monitoring system 130). For instance, the first device information may have been captured by enterprise device identification computing platform 110 responsive to receiving information from enterprise center monitoring system 120 indicating that the first malicious event was detected at the first enterprise location, as in the illustrative event sequence described above.

At step 302, enterprise center monitoring system 130 may detect device presence and/or otherwise identify device presence at the second enterprise location. For example, at step 302, based on the first device information received from the enterprise device identification computing platform (e.g., enterprise device identification computing platform 110), enterprise center monitoring system 130 may detect that a first device (e.g., end user mobile computing device 170) of the first plurality of devices present at the first enterprise location during the time period corresponding to the first malicious event is present at a second enterprise location associated with the enterprise center monitoring system (e.g., enterprise center monitoring system 130).

In some embodiments, detecting that the first device of the first plurality of devices present at the first enterprise location during the time period corresponding to the first malicious event is present at the second enterprise location associated with the enterprise center monitoring system may include scanning for devices present at the second enterprise location. For example, in detecting that the first device (e.g., end user mobile computing device 170) of the first plurality of devices present at the first enterprise location during the time period corresponding to the first malicious event is present at the second enterprise location associated with the enterprise center monitoring system (e.g., enterprise center monitoring system 130) at step 302, enterprise center monitoring system 130 may scan for devices present at the second enterprise location. For instance, enterprise center monitoring system 130 may execute one or more wireless interrogation functions to ping one or more devices within wireless transmission range of enterprise center monitoring system 130 and/or the second enterprise location.

In some embodiments, detecting that the first device of the first plurality of devices present at the first enterprise location during the time period corresponding to the first malicious event is present at the second enterprise location associated with the enterprise center monitoring system may include identifying that the first device is scanning for available wireless connections at the second enterprise location. For example, in detecting that the first device (e.g., end user mobile computing device 170) of the first plurality of devices present at the first enterprise location during the time period corresponding to the first malicious event is present at the second enterprise location associated with the enterprise center monitoring system (e.g., enterprise center monitoring system 130) at step 302, enterprise center monitoring system 130 may identify that the first device (e.g., end user mobile computing device 170) is scanning for available wireless connections at the second enterprise location. For instance, enterprise center monitoring system 130 may determine that end user mobile computing device 170 currently is or recently has scanned for a public wireless connection within wireless transmission range of enterprise center monitoring system 130 and/or the second enterprise location.

At step 303, enterprise center monitoring system 130 may generate one or more augmented reality overlay commands. For example, at step 303, in response to detecting that the first device (e.g., end user mobile computing device 170) of the first plurality of devices present at the first enterprise location during the time period corresponding to the first malicious event is present at the second enterprise location associated with the enterprise center monitoring system (e.g., enterprise center monitoring system 130), enterprise center monitoring system 130 may generate one or more commands directing an augmented reality device (e.g., enterprise center augmented reality device 180) at the second enterprise location to display an overlay highlighting a user in possession of the first device (e.g., end user mobile computing device 170). As discussed in greater detail below, the overlay may enable a user of enterprise center augmented reality device 180 (who may, e.g., be an enterprise employee at the enterprise center) to quickly identify end user mobile computing device 170 and/or the user of end user mobile computing device 170, so as to address any risks presented by the presence of end user mobile computing device 170 and/or the user of end user mobile computing device 170 (e.g., in view of end user mobile computing device 170 and/or the user of end user mobile computing device 170 being present at the first enterprise location during the time period corresponding to the first malicious event).

In some embodiments, generating the one or more commands directing the augmented reality device at the second enterprise location to display the overlay highlighting the user in possession of the first device may include inserting a unique device signature associated with the first device into the one or more commands directing the augmented reality device at the second enterprise location to display the overlay highlighting the user in possession of the first device. For example, in generating the one or more commands directing the augmented reality device (e.g., enterprise center augmented reality device 180) at the second enterprise location to display the overlay highlighting the user in possession of the first device (e.g., end user mobile computing device 170) at step 303, enterprise center monitoring system 130 may insert a unique device signature associated with the first device (e.g., end user mobile computing device 170) into the one or more commands directing the augmented reality device (e.g., enterprise center augmented reality device 180) at the second enterprise location to display the overlay highlighting the user in possession of the first device (e.g., end user mobile computing device 170).

In some embodiments, generating the one or more commands directing the augmented reality device at the second enterprise location to display the overlay highlighting the user in possession of the first device may include inserting a timestamp, location identifier, and event-type identifier associated with the first malicious event and the first device into the one or more commands directing the augmented reality device at the second enterprise location to display the overlay highlighting the user in possession of the first device. For example, in generating the one or more commands directing the augmented reality device (e.g., enterprise center augmented reality device 180) at the second enterprise location to display the overlay highlighting the user in possession of the first device (e.g., end user mobile computing device 170) at step 303, enterprise center monitoring system 130 may insert a timestamp, location identifier, and event-type identifier associated with the first malicious event and the first device (e.g., end user mobile computing device 170) into the one or more commands directing the augmented reality device (e.g., enterprise center augmented reality device 180) at the second enterprise location to display the overlay highlighting the user in possession of the first device (e.g., end user mobile computing device 170).

At step 304, enterprise center monitoring system 130 may send the one or more augmented reality overlay commands to enterprise center augmented reality device 180. For example, at step 304, enterprise center monitoring system 130 may send, via the communication interface (e.g., communication interface 113), to the augmented reality device (e.g., enterprise center augmented reality device 180) at the second enterprise location, the one or more commands directing the augmented reality device (e.g., enterprise center augmented reality device 180) at the second enterprise location to display the overlay highlighting the user in possession of the first device (e.g., end user mobile computing device 170). In addition, by sending the one or more commands directing the augmented reality device (e.g., enterprise center augmented reality device 180) at the second enterprise location to display the overlay highlighting the user in possession of the first device (e.g., end user mobile computing device 170) to the augmented reality device (e.g., enterprise center augmented reality device 180) at the second enterprise location, enterprise center monitoring system 130 may cause the augmented reality device (e.g., enterprise center augmented reality device 180) at the second enterprise location to present at least one augmented-reality user interface comprising at least one augmented-reality user interface element identifying the user in possession of the first device (e.g., end user mobile computing device 170). For instance, enterprise center monitoring system 130 may cause enterprise center augmented reality device 180 to locate end user mobile computing device 170; identify a user carrying, holding, or otherwise possessing end user mobile computing device 170; and draw and/or otherwise generate an outline, highlighted shape, or other augmented-reality user interface element on end user mobile computing device 170 and/or the user possessing end user mobile computing device 170 (e.g., as part of an augmented-reality user interface that is displayed and/or otherwise presented by enterprise center augmented reality device 180).

In some embodiments, sending the one or more commands directing the augmented reality device at the second enterprise location to display the overlay highlighting the user in possession of the first device to the augmented reality device at the second enterprise location may cause the augmented reality device at the second enterprise location to display a unique device signature associated with the first device as an augmented-reality user interface element in the at least one augmented-reality user interface. For example, by sending the one or more commands directing the augmented reality device (e.g., enterprise center augmented reality device 180) at the second enterprise location to display the overlay highlighting the user in possession of the first device (e.g., end user mobile computing device 170) to the augmented reality device (e.g., enterprise center augmented reality device 180) at the second enterprise location, enterprise center monitoring system 130 may cause the augmented reality device (e.g., enterprise center augmented reality device 180) at the second enterprise location to display a unique device signature associated with the first device (e.g., end user mobile computing device 170) as an augmented-reality user interface element in the at least one augmented-reality user interface. The unique device signature associated with the first device (e.g., end user mobile computing device 170) may, for instance, be displayed as a floating label in the at least one augmented-reality user interface presented by enterprise center augmented reality device 180.

In some embodiments, sending the one or more commands directing the augmented reality device at the second enterprise location to display the overlay highlighting the user in possession of the first device to the augmented reality device at the second enterprise location may cause the augmented reality device at the second enterprise location to display a timestamp, location identifier, and event-type identifier associated with the first malicious event and the first device as an augmented-reality user interface element in the at least one augmented-reality user interface. For example, by sending the one or more commands directing the augmented reality device (e.g., enterprise center augmented reality device 180) at the second enterprise location to display the overlay highlighting the user in possession of the first device (e.g., end user mobile computing device 170) to the augmented reality device (e.g., enterprise center augmented reality device 180) at the second enterprise location, enterprise center monitoring system 130 may cause the augmented reality device (e.g., enterprise center augmented reality device 180) at the second enterprise location to display a timestamp, location identifier, and event-type identifier associated with the first malicious event and the first device (e.g., end user mobile computing device 170) as an augmented-reality user interface element in the at least one augmented-reality user interface. The timestamp, location identifier, and event-type identifier associated with the first malicious event and the first device (e.g., end user mobile computing device 170) may, for instance, be displayed as a floating label in the at least one augmented-reality user interface presented by enterprise center augmented reality device 180.

In some embodiments, sending the one or more commands directing the augmented reality device at the second enterprise location to display the overlay highlighting the user in possession of the first device to the augmented reality device at the second enterprise location may cause the augmented reality device at the second enterprise location to display an outline of the user in possession of the first device as an augmented-reality user interface element in the at least one augmented-reality user interface. For example, by sending the one or more commands directing the augmented reality device (e.g., enterprise center augmented reality device 180) at the second enterprise location to display the overlay highlighting the user in possession of the first device (e.g., end user mobile computing device 170) to the augmented reality device (e.g., enterprise center augmented reality device 180) at the second enterprise location, enterprise center monitoring system 130 may cause the augmented reality device (e.g., enterprise center augmented reality device 180) at the second enterprise location to display an outline of the user in possession of the first device (e.g., end user mobile computing device 170) as an augmented-reality user interface element in the at least one augmented-reality user interface. The outline of the user in possession of the first device (e.g., end user mobile computing device 170) may, for instance, be displayed as a floating square, rectangle, or other shape around the user in the at least one augmented-reality user interface presented by enterprise center augmented reality device 180.

In some embodiments, sending the one or more commands directing the augmented reality device at the second enterprise location to display the overlay highlighting the user in possession of the first device to the augmented reality device at the second enterprise location may cause the augmented reality device at the second enterprise location to display an outline of the first device as an augmented-reality user interface element in the at least one augmented-reality user interface. For example, by sending the one or more commands directing the augmented reality device (e.g., enterprise center augmented reality device 180) at the second enterprise location to display the overlay highlighting the user in possession of the first device (e.g., end user mobile computing device 170) to the augmented reality device (e.g., enterprise center augmented reality device 180) at the second enterprise location, enterprise center monitoring system 130 may cause the augmented reality device (e.g., enterprise center augmented reality device 180) at the second enterprise location to display an outline of the first device (e.g., end user mobile computing device 170) as an augmented-reality user interface element in the at least one augmented-reality user interface. The outline of the first device (e.g., end user mobile computing device 170) may, for instance, be displayed as a floating square, rectangle, or other shape around the device in the at least one augmented-reality user interface presented by enterprise center augmented reality device 180.

Referring to FIG. 3B, at step 305, enterprise center augmented reality device 180 may receive, from enterprise center monitoring system 130, the one or more commands directing the augmented reality device (e.g., enterprise center augmented reality device 180) at the second enterprise location to display the overlay highlighting the user in possession of the first device (e.g., end user mobile computing device 170). At step 306, enterprise center augmented reality device 180 may identify the detected device. For example, at step 306, enterprise center augmented reality device 180 may identify the first device (e.g., end user mobile computing device 170) using one or more radiofrequency ranging functions executed by enterprise center augmented reality device 180 and/or enterprise center monitoring system 130, using one or more image pattern detection functions executed by enterprise center augmented reality device 180, and/or using other techniques.

At step 307, enterprise center augmented reality device 180 may generate at least one augmented-reality user interface comprising an augmented-reality user interface element. For example, enterprise center augmented reality device 180 may generate at least one augmented-reality user interface comprising an augmented-reality user interface element highlighting the first device (e.g., end user mobile computing device 170) and/or the user in possession of the first device (e.g., end user mobile computing device 170).

Figure 6:
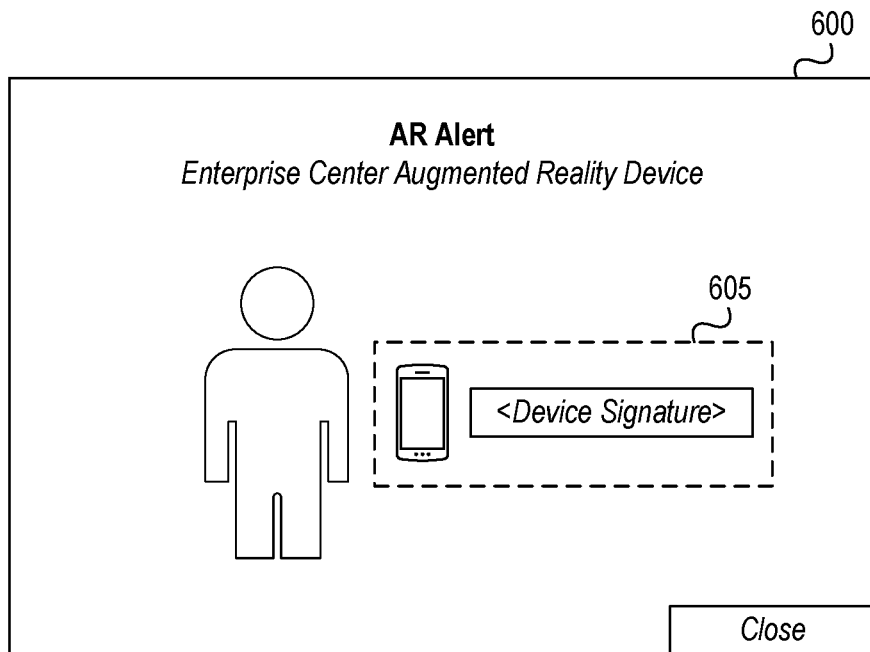

At step 308, enterprise center augmented reality device 180 may present the at least one augmented-reality user interface comprising the augmented-reality user interface element. For example, at step 308, enterprise center augmented reality device 180 may display and/or otherwise present a graphical, augmented-reality user interface similar to graphical user interface 600, which is illustrated in FIG. 6. As seen in FIG. 6, graphical user interface 600 may include an augmented-reality user interface element 605 highlighting physical presence of the first device (e.g., end user mobile computing device 170) and/or the physical presence of the user of the first device (e.g., end user mobile computing device 170), which may be viewable on and/or through a display screen of enterprise center augmented reality device 180. Additionally, the augmented-reality user interface element 605 may include device signature information in a floating label presented as part of the augmented-reality user interface.

Figure 7:
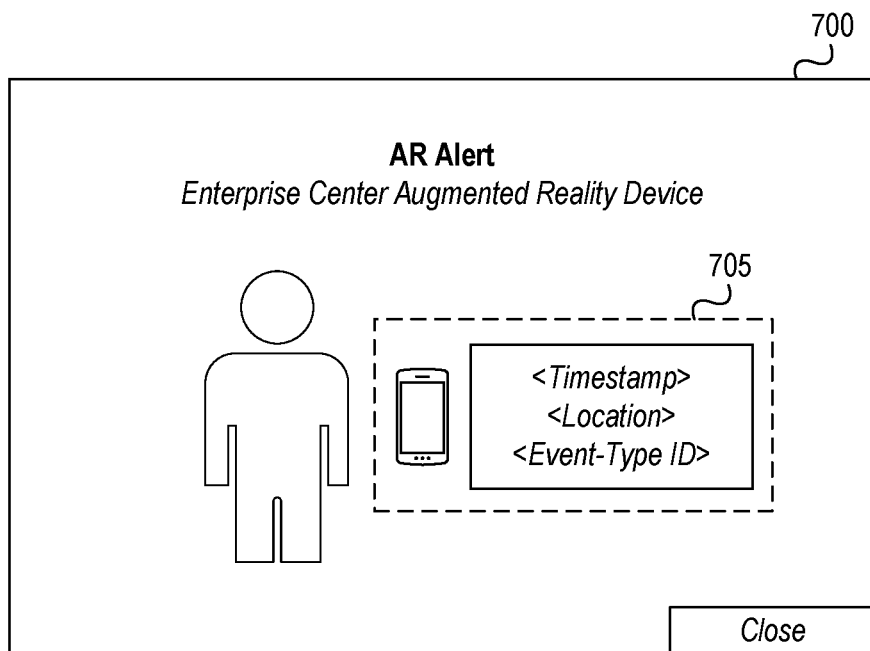

Additionally or alternatively, at step 308, enterprise center augmented reality device 180 may display and/or otherwise present a graphical, augmented-reality user interface similar to graphical user interface 700, which is illustrated in FIG. 7. As seen in FIG. 7, graphical user interface 700 may include an augmented-reality user interface element 705 highlighting physical presence of the first device (e.g., end user mobile computing device 170) and/or the physical presence of the user of the first device (e.g., end user mobile computing device 170), which may be viewable on and/or through a display screen of enterprise center augmented reality device 180. Additionally, the augmented-reality user interface element 705 may include a timestamp, location identifier, and event-type identifier associated with the first malicious event and the first device (e.g., end user mobile computing device 170) in a floating label presented as part of the augmented-reality user interface.

Figure 8:
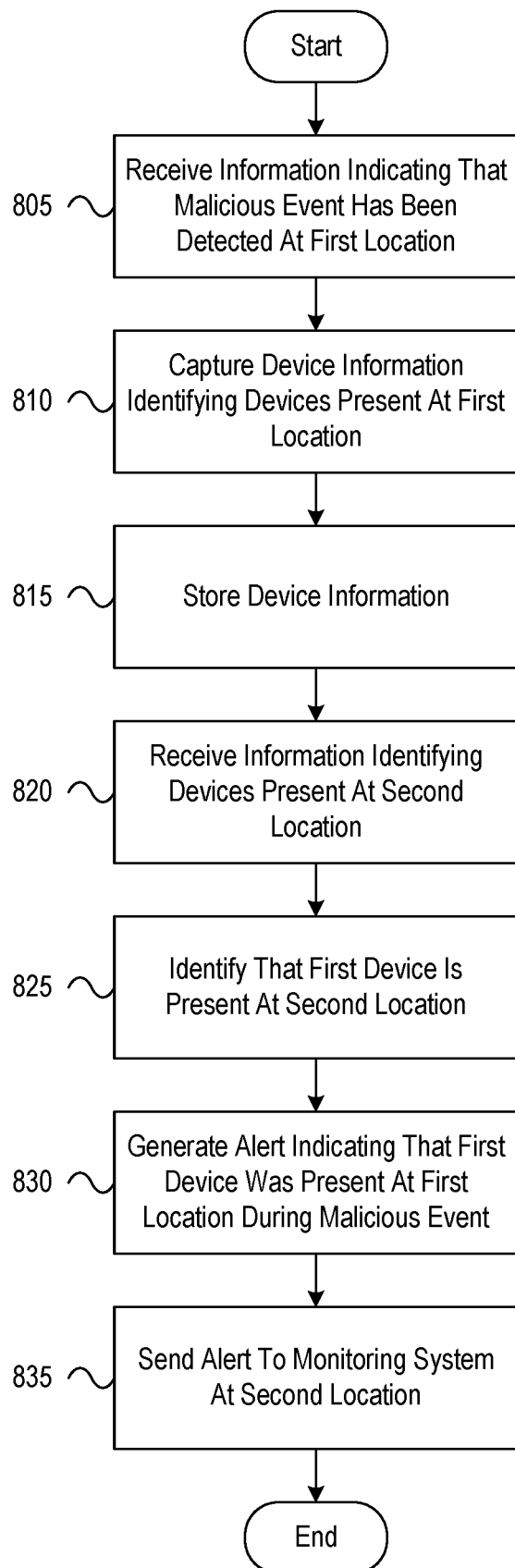
FIG. 8 depicts an illustrative method for detecting and identifying devices at enterprise locations to protect enterprise-managed information and resources in accordance with one or more example embodiments.

FIG. 8 depicts an illustrative method for detecting and identifying devices at enterprise locations to protect enterprise-managed information and resources in accordance with one or more example embodiments. Referring to FIG. 8, at step 805, a computing platform having at least one processor, a communication interface, and memory may receive, via the communication interface, from a first enterprise center monitoring system associated with a first enterprise location, information indicating that a first malicious event has been detected at the first enterprise location. At step 810, in response to receiving the information indicating that the first malicious event has been detected at the first enterprise location, the computing platform may capture first device information identifying a first plurality of devices present at the first enterprise location during a time period corresponding to the first malicious event. At step 815, the computing platform may store the first device information identifying the first plurality of devices present at the first enterprise location during the time period corresponding to the first malicious event.

At step 820, after storing the first device information identifying the first plurality of devices present at the first enterprise location during the time period corresponding to the first malicious event, the computing platform may receive, via the communication interface, from a second enterprise center monitoring system associated with a second enterprise location, second device information identifying a second plurality of devices present at the second enterprise location. At step 825, the computing platform may identify that a first device of the first plurality of devices present at the first enterprise location during the time period corresponding to the first malicious event is present at the second enterprise location based on the second device information received from the second enterprise center monitoring system associated with the second enterprise location.

At step 830, in response to identifying that the first device of the first plurality of devices present at the first enterprise location during the time period corresponding to the first malicious event is present at the second enterprise location, the computing platform may generate an alert indicating that the first device of the first plurality of devices is present at the second enterprise location and was present at the first enterprise location during the time period corresponding to the first malicious event. At step 835, the computing platform may send, via the communication interface, to the second enterprise center monitoring system associated with the second enterprise location, the alert indicating that the first device of the first plurality of devices is present at the second enterprise location and was present at the first enterprise location during the time period corresponding to the first malicious event.

Figure 9:
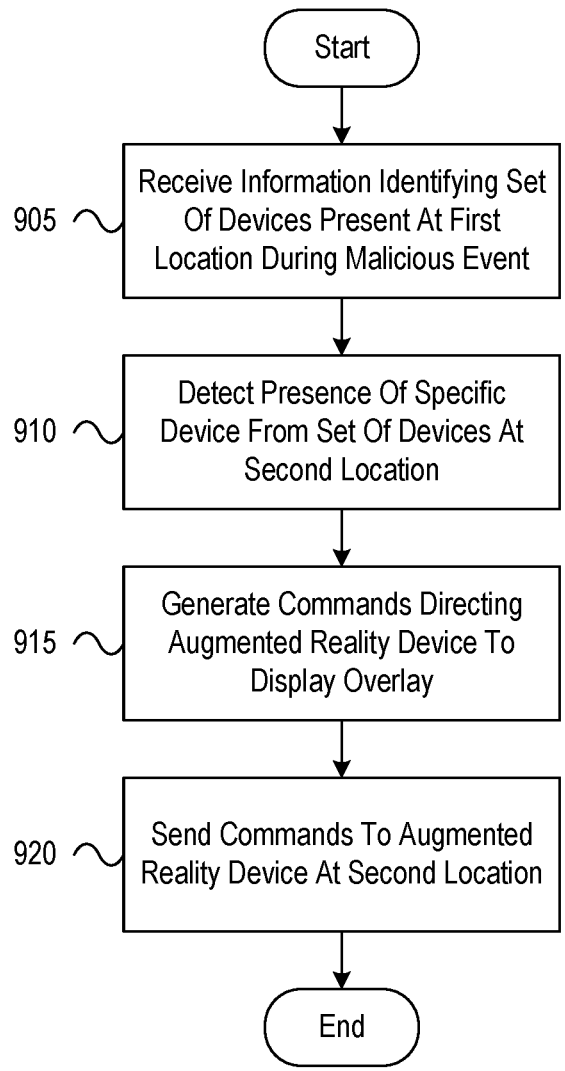
FIG. 9 depicts another illustrative method for detecting and identifying devices at enterprise locations to protect enterprise-managed information and resources in accordance with one or more example embodiments.

FIG. 9 depicts another illustrative method for detecting and identifying devices at enterprise locations to protect enterprise-managed information and resources in accordance with one or more example embodiments. Referring to FIG. 9, at step 905, an enterprise center monitoring system having at least one processor, a communication interface, and memory may receive, via the communication interface, from an enterprise device identification computing platform, first device information identifying a first plurality of devices present at a first enterprise location during a time period corresponding to a first malicious event. At step 910, based on the first device information received from the enterprise device identification computing platform, the enterprise center monitoring system may detect that a first device of the first plurality of devices present at the first enterprise location during the time period corresponding to the first malicious event is present at a second enterprise location associated with the enterprise center monitoring system.

At step 915, in response to detecting that the first device of the first plurality of devices present at the first enterprise location during the time period corresponding to the first malicious event is present at the second enterprise location associated with the enterprise center monitoring system, the enterprise center monitoring system may generate one or more commands directing an augmented reality device at the second enterprise location to display an overlay highlighting a user in possession of the first device. At step 920, the enterprise center monitoring system may send, via the communication interface, to the augmented reality device at the second enterprise location, the one or more commands directing the augmented reality device at the second enterprise location to display the overlay highlighting the user in possession of the first device. In addition, by sending the one or more commands directing the augmented reality device at the second enterprise location to display the overlay highlighting the user in possession of the first device to the augmented reality device at the second enterprise location, the enterprise center monitoring system may cause the augmented reality device at the second enterprise location to present at least one augmented-reality user interface comprising at least one augmented-reality user interface element identifying the user in possession of the first device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An enterprise center monitoring system, comprising:
at least one processor;
a communication interface communicatively coupled to the at least one processor; and
memory storing computer-readable instructions that, when executed by the at least one processor, cause the enterprise center monitoring system to:
receive, via the communication interface, from an enterprise device identification computing platform, first device information identifying a first plurality of devices present at a first enterprise location during a time period corresponding to a first malicious event;
based on the first device information received from the enterprise device identification computing platform, detect that a first device of the first plurality of devices present at the first enterprise location during the time period corresponding to the first malicious event is present at a second enterprise location associated with the enterprise center monitoring system;

in response to detecting that the first device of the first plurality of devices present at the first enterprise location during the time period corresponding to the first malicious event is present at the second enterprise location associated with the enterprise center monitoring system, generate one or more commands directing an augmented reality device at the second enterprise location to display an overlay highlighting a user in possession of the first device of the first plurality of devices; and send, via the communication interface, to the augmented reality device at the second enterprise location, the one or more commands directing the augmented reality device at the second enterprise location to display the overlay highlighting the user in possession of the first device of the first plurality of devices, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to present at least one augmented-reality user interface comprising at least one augmented-reality user interface element identifying the user in possession of the first device of the first plurality of devices.

2. The enterprise center monitoring system of claim 1, wherein receiving the first device information identifying the first plurality of devices present at the first enterprise location during the time period corresponding to the first malicious event comprises receiving device data captured by the enterprise device identification computing platform from a monitoring system different from the enterprise center monitoring system.

3. The enterprise center monitoring system of claim 1, wherein detecting that the first device of the first plurality of devices present at the first enterprise location during the time period corresponding to the first malicious event is present at the second enterprise location associated with the enterprise center monitoring system comprises scanning for devices present at the second enterprise location.

4. The enterprise center monitoring system of claim 1, wherein detecting that the first device of the first plurality of devices present at the first enterprise location during the time period corresponding to the first malicious event is present at the second enterprise location associated with the enterprise center monitoring system comprises identifying that the first device of the first plurality of devices is scanning for available wireless connections at the second enterprise location.

5. The enterprise center monitoring system of claim 1, wherein generating the one or more commands directing the augmented reality device at the second enterprise location to display the overlay highlighting the user in possession of the first device of the first plurality of devices comprises inserting a unique device signature associated with the first device of the first plurality of devices into the one or more commands directing the augmented reality device at the second enterprise location to display the overlay highlighting the user in possession of the first device of the first plurality of devices.

6. The enterprise center monitoring system of claim 1, wherein generating the one or more commands directing the augmented reality device at the second enterprise location to display the overlay highlighting the user in possession of the first device of the first plurality of devices comprises inserting a timestamp, location identifier, and event-type identifier associated with the first malicious event and the first device of the first plurality of devices into the one or more commands directing the augmented reality device at the second enterprise location to display the overlay highlighting the user in possession of the first device of the first plurality of devices.

7. The enterprise center monitoring system of claim 1, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display a unique device signature associated with the first device of the first plurality of devices as an augmented-reality user interface element in the at least one augmented-reality user interface.

8. The enterprise center monitoring system of claim 1, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display a timestamp, location identifier, and event-type identifier associated with the first malicious event and the first device of the first plurality of devices as an augmented-reality user interface element in the at least one augmented-reality user interface.

9. The enterprise center monitoring system of claim 1, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display an outline of the user in possession of the first device of the first plurality of devices as an augmented-reality user interface element in the at least one augmented-reality user interface.

10. The enterprise center monitoring system of claim 1, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display an outline of the first device of the first plurality of devices as an augmented-reality user interface element in the at least one augmented-reality user interface.

11. A method, comprising:
at an enterprise center monitoring system comprising at least one processor, a communication interface, and memory:
receiving, by the at least one processor, via the communication interface, from an enterprise device identification computing platform, first device information identifying a first plurality of devices present at a first enterprise location during a time period corresponding to a first malicious event;

based on the first device information received from the enterprise device identification computing platform, detecting, by the at least one processor, that a first device of the first plurality of devices present at the first enterprise location during the time period corresponding to the first malicious event is present at a second enterprise location associated with the enterprise center monitoring system;

in response to detecting that the first device of the first plurality of devices present at the first enterprise location during the time period corresponding to the first malicious event is present at the second enterprise location associated with the enterprise center monitoring system, generating, by the at least one processor, one or more commands directing an augmented reality device at the second enterprise location to display an overlay highlighting a user in possession of the first device of the first plurality of devices; and sending, by the at least one processor, via the communication interface, to the augmented reality device at the second enterprise location, the one or more commands directing the augmented reality device at the second enterprise location to display the overlay highlighting the user in possession of the first device of the first plurality of devices, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to present at least one augmented-reality user interface comprising at least one augmented-reality user interface element identifying the user in possession of the first device of the first plurality of devices.

12. The method of claim 11, wherein receiving the first device information identifying the first plurality of devices present at the first enterprise location during the time period corresponding to the first malicious event comprises receiving device data captured by the enterprise device identification computing platform from a monitoring system different from the enterprise center monitoring system.

13. The method of claim 11, wherein detecting that the first device of the first plurality of devices present at the first enterprise location during the time period corresponding to the first malicious event is present at the second enterprise location associated with the enterprise center monitoring system comprises scanning for devices present at the second enterprise location.

14. The method of claim 11, wherein detecting that the first device of the first plurality of devices present at the first enterprise location during the time period corresponding to the first malicious event is present at the second enterprise location associated with the enterprise center monitoring system comprises identifying that the first device of the first plurality of devices is scanning for available wireless connections at the second enterprise location.

15. The method of claim 11, wherein generating the one or more commands directing the augmented reality device at the second enterprise location to display the overlay highlighting the user in possession of the first device of the first plurality of devices comprises inserting a unique device signature associated with the first device of the first plurality of devices into the one or more commands directing the augmented reality device at the second enterprise location to display the overlay highlighting the user in possession of the first device of the first plurality of devices.

16. The method of claim 11, wherein generating the one or more commands directing the augmented reality device at the second enterprise location to display the overlay highlighting the user in possession of the first device of the first plurality of devices comprises inserting a timestamp, location identifier, and event-type identifier associated with the first malicious event and the first device of the first plurality of devices into the one or more commands directing the augmented reality device at the second enterprise location to display the overlay highlighting the user in possession of the first device of the first plurality of devices.

17. The method of claim 11, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display a unique device signature associated with the first device of the first plurality of devices as an augmented-reality user interface element in the at least one augmented-reality user interface.

18. The method of claim 11, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display a timestamp, location identifier, and event-type identifier associated with the first malicious event and the first device of the first plurality of devices as an augmented-reality user interface element in the at least one augmented-reality user interface.

19. The method of claim 11, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to display an outline of the user in possession of the first device of the first plurality of devices as an augmented-reality user interface element in the at least one augmented-reality user interface.

20. One or more non-transitory computer-readable media storing instructions that, when executed by an enterprise center monitoring system comprising at least one processor, a communication interface, and memory, cause the enterprise center monitoring system to:

receive, via the communication interface, from an enterprise device identification computing platform, first device information identifying a first plurality of devices present at a first enterprise location during a time period corresponding to a first malicious event;

based on the first device information received from the enterprise device identification computing platform, detect that a first device of the first plurality of devices present at the first enterprise location during the time period corresponding to the first malicious event is present at a second enterprise location associated with the enterprise center monitoring system;

in response to detecting that the first device of the first plurality of devices present at the first enterprise location during the time period corresponding to the first malicious event is present at the second enterprise location associated with the enterprise center monitoring system, generate one or more commands directing an augmented reality device at the second enterprise location to display an overlay highlighting a user in possession of the first device of the first plurality of devices; and send, via the communication interface, to the augmented reality device at the second enterprise location, the one or more commands directing the augmented reality device at the second enterprise location to display the overlay highlighting the user in possession of the first device of the first plurality of devices, wherein sending the one or more commands directing the augmented reality device at the second enterprise location to display the overlay highlighting the user in possession of the first device of the first plurality of devices to the augmented reality device at the second enterprise location causes the augmented reality device at the second enterprise location to present at least one augmented-reality user interface comprising at least one augmented-reality user interface element identifying the user in possession of the first device of the first plurality of devices.

* * * * *